US012361763B2

(12) United States Patent
Cui

(10) Patent No.: US 12,361,763 B2
(45) Date of Patent: Jul. 15, 2025

(54) FINGERPRINT RECOGNITION METHOD AND ELECTRONIC DEVICE

(71) Applicant: HONOR DEVICE CO., LTD., Shenzhen (CN)

(72) Inventor: Chuang Cui, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/699,830

(22) PCT Filed: Aug. 15, 2023

(86) PCT No.: PCT/CN2023/113145
§ 371 (c)(1),
(2) Date: Apr. 9, 2024

(87) PCT Pub. No.: WO2024/046114
PCT Pub. Date: Mar. 7, 2024

(65) Prior Publication Data
US 2025/0014391 A1   Jan. 9, 2025

(30) Foreign Application Priority Data
Sep. 2, 2022  (CN) .......................... 202211069227.2

(51) Int. Cl.
*G06V 40/50*  (2022.01)
*G06V 10/98*  (2022.01)
(Continued)

(52) U.S. Cl.
CPC ............ *G06V 40/50* (2022.01); *G06V 10/993* (2022.01); *G06V 40/1365* (2022.01); *G06V 40/67* (2022.01)

(58) Field of Classification Search
CPC .. G06V 40/50; G06V 10/993; G06V 40/1365; G06V 40/67; G06V 10/17; G06V 10/62; G06V 40/1347; G06V 10/225
See application file for complete search history.

(56) References Cited

U.S. PATENT DOCUMENTS 11,055,511 B2  7/2021  Satou et al.
11,281,885 B2  3/2022  Zhang et al.
(Continued)

FOREIGN PATENT DOCUMENTS

CN   105045384 A   11/2015
CN   106548129 A    3/2017
(Continued)

OTHER PUBLICATIONS

Qiu Xiao;"Research on Fast Identification Method of Low Quality Damaged Fingerprint"; Chongqing University; Dissertation for the Master Degree;Jun. 15, 2018; pp. 66 (with English abstract).
(Continued)

*Primary Examiner* — Abhishek Sarma
(74) *Attorney, Agent, or Firm* — WOMBLE BOND DICKINSON (US) LLP

(57) ABSTRACT

This application discloses a fingerprint recognition method and an electronic device, and relates to the terminal field. The method includes: obtaining, by an electronic device, fingerprint images in response to a press operation performed by a user on a fingerprint collection region of the electronic device, and determining image types of the fingerprint images, where the image types include a first type of images, and the first type of images are fingerprint images including a pattern of a foreign matter; and marking the first type of images when it is determined that the fingerprint (Continued)

images include the first type of images, and updating a first type of marked images to a fingerprint template library of the electronic device.

20 Claims, 13 Drawing Sheets

(51) Int. Cl.
*G06V 40/12* (2022.01)
*G06V 40/60* (2022.01)

(56) References Cited

U.S. PATENT DOCUMENTS

| | | | |
|---|---|---|---|
| 11,341,362 | B2 | 5/2022 | Jiang |
| 11,386,717 | B2 | 7/2022 | Shen |
| 2019/0251393 | A1* | 8/2019 | Jiang ............... G06V 40/50 |
| 2020/0264756 | A1 | 8/2020 | Jin et al. |

FOREIGN PATENT DOCUMENTS

| | | |
|---|---|---|
| CN | 107122761 A | 9/2017 |
| CN | 108288050 A | 7/2018 |
| CN | 108460346 A | 8/2018 |
| CN | 108509944 A | 9/2018 |
| CN | 109800731 A | 5/2019 |
| CN | 110287680 A | 9/2019 |
| CN | 110766074 A | 2/2020 |
| CN | 107229544 B | 6/2020 |
| CN | 111752654 A | 10/2020 |
| CN | 109145800 B | 6/2021 |
| CN | 113239817 A | 8/2021 |
| CN | 113325941 A | 8/2021 |
| CN | 109313705 A | 10/2021 |
| CN | 113807141 A | 12/2021 |
| CN | 114463791 A | 5/2022 |
| CN | 115131835 A | 9/2022 |
| IN | 202014013925 A | 3/2024 |

OTHER PUBLICATIONS

Denis Adrian Chavez et al;"Fingerprint detection on low contrast surfaces using phosphorescent nanomaterials"; Retrieved from the internet, URL:https://pubs.aip.org/aip/acp/article-pdf/doi/10.1063/1.5094304/14179710/020001_1_online.pdf; Mar. 21, 2019;pp. 7.

* cited by examiner

FINGERPRINT RECOGNITION METHOD AND ELECTRONIC DEVICE

CROSS-REFERENCE TO RELATED APPLICATIONS

This application is a national stage of International Application No. PCT/CN2023/113145, filed on Aug. 15, 2023, which claims priority to Chinese Patent Application No. 202211069227.2, filed on Sep. 2, 2022. The disclosures of both of the aforementioned applications are hereby incorporated by reference in their entireties.

TECHNICAL FIELD

This application relates to the terminal field, and in particular to a fingerprint recognition method and an electronic device.

BACKGROUND

With development of information recognition technologies, situations in which an electronic device performs fingerprint input and fingerprint unlocking based on a fingerprint recognition technology are increasingly mature. Regardless of being in-screen fingerprint unlocking or capacitive fingerprint unlocking, when a position of collecting a fingerprint is clean, quick fingerprint unlocking can be implemented.

However, in an actual use situation, foreign matters may exist in a fingerprint unlocking position. For example, a hairline or a copper wire exists in the fingerprint unlocking position, a crack or scratch exists on to a screen or screen protector, or a protective film with a texture is stuck. The foreign matters affect fingerprint collection. Consequently, it is easy to cause a fingerprint input failure or a fingerprint unlocking failure. Alternatively, in a situation of performing fingerprint unlocking, because a foreign matter exists in a fingerprint unlocking position to interfere with recognition, a problem that unlocking may be implemented with a non-input fingerprint may be further caused, which poses a threat to security of the electronic device.

SUMMARY

Embodiments of this application provide a fingerprint recognition method and an electronic device, to resolve the foregoing problem that an execution failure or a risk may exist in fingerprint input and fingerprint unlocking in the existing technology when a foreign matter exists in a fingerprint unlocking position. To achieve the foregoing objective, the following technical solutions are used in embodiments of this application.

According to a first aspect, a fingerprint recognition method is provided, the method including: obtaining one or more fingerprint images in response to a press operation performed by a user on a fingerprint collection region of an electronic device; determining image types of the one or more fingerprint images, where the image types include a first type of images; and the first type of images are fingerprint images including a pattern of a foreign matter; and determining that the one or more fingerprint images include the first type of images, marking the first type of images, and updating a first type of marked images to a fingerprint template library of the electronic device.

The pattern of the foreign matter is a same texture in a same fixed position in the plurality of fingerprint images.

The press operation in this embodiment may be a fingerprint input press operation in a fingerprint input situation; or may be a fingerprint verification press operation in a fingerprint verification situation. After obtaining the one or more fingerprint images, the electronic device performs comparison and recognition of the pattern of the foreign matter on the one or more fingerprint images, and determines the image types of the one or more fingerprint images. When it is determined that the one or more fingerprint images include the first type of images with the pattern of the foreign matter, the pattern of the foreign matter in the first type of images is marked, and then the first type of marked images are updated to the fingerprint template library of the electronic device. Optionally, the marking includes either of elimination processing and binarization processing.

In this embodiment, the electronic device may mark the pattern of the foreign matter in the first type of images, and update the first type of marked images to the template library. The marking, by the electronic device, the pattern of the foreign matter in the first type of images is actually performing elimination processing on the pattern of the foreign matter in the first type of images and storing a first type of images with the pattern of the foreign matter eliminated into the fingerprint library to become a fingerprint template. In a process of performing fingerprint matching according to a fingerprint template, the marked pattern of the foreign matter does not participate in fingerprint matching, thereby avoiding a case that the pattern of the foreign matter affect matching of other valid fingerprints, and increasing a fingerprint recognition rate.

With reference to the first aspect, in a possible design manner, in a fingerprint input situation, the one or more fingerprint images include a plurality of fingerprint images; and the determining image types of the one or more fingerprint images includes: performing, according to an obtaining sequence of the plurality of fingerprint images, foreign matter comparison between a current fingerprint image and each preceding fingerprint image; determining, if it is determined that the pattern of the foreign matter exists in a first quantity of fingerprint images, that the first quantity of fingerprint images are the first type of images, where the pattern of the foreign matter is a same texture in a same fixed position in the plurality of fingerprint images; and the first quantity is greater than or equal to a first preset quantity; and determining fingerprint images in the plurality of fingerprint images other than the first type of images as a second type of fingerprint images.

In the fingerprint input situation, the electronic device may obtain a plurality of fingerprint images, and store each obtained fingerprint image into a temporary storage space. After obtaining the second and the following fingerprint images, the electronic device may perform, according to an obtaining sequence, foreign matter comparison between the current fingerprint image and each previously obtained fingerprint image, thereby determining whether the pattern of the foreign matter exists in the fingerprint images. It is determined, if the electronic device determines that the pattern of the foreign matter exists in a first quantity of fingerprint images, that the first quantity of fingerprint images are the first type of images. Fingerprint images that are in the plurality of fingerprint images and that are not determined as the first type of images are the second type of images.

In this embodiment, in the fingerprint input situation, the electronic device may perform comparison and recognition of the pattern of the foreign matter on the plurality of obtained fingerprint images, set a determination condition for a cumulative quantity, and determine, when it is determined that the pattern of the foreign matter exists in the first quantity of fingerprint images, that the first quantity of fingerprint images are the first type of images. The quantity condition in this embodiment increases recognition accuracy of the first type of images in the fingerprint input situation.

With reference to the first aspect, in a possible design manner, after the obtaining one or more fingerprint images, the method further includes:

determining that each of the one or more fingerprint images satisfies a fingerprint input condition, where that the fingerprint input condition is satisfied includes: image quality of the fingerprint image satisfies a quality requirement, and a valid fingerprint coverage area in the fingerprint image is greater than an area threshold, where that the image quality satisfies the quality requirement includes: a resolution of the fingerprint image is greater than a resolution threshold, and/or a contrast of the fingerprint image is greater than a contrast threshold.

In this embodiment, the electronic device may determine, according to the fingerprint input condition, whether the one or more obtained fingerprint images satisfy the input condition. When it is determined that the one or more obtained fingerprint images satisfy the fingerprint input condition, the electronic device may execute an operation of determining image types of the one or more fingerprint images. For example, if it is determined that the one or more fingerprint images are the first type of images, the first type of images are subject to foreign matter marking and then input to the fingerprint template library. In another example, if it is determined that the one or more fingerprint images are the second type of images, the second type of images are directly input to the fingerprint template library.

In this embodiment, when the one or more fingerprint images satisfy the fingerprint input condition, the electronic device may input the one or more fingerprint images to the fingerprint template library, which can increase validity of each fingerprint template in the fingerprint template library.

With reference to the first aspect, in a possible design manner, in a fingerprint verification situation, the one or more fingerprint images are one fingerprint image, the fingerprint template library includes at least one fingerprint template; and before the determining image types of the one or more fingerprint images, the method further includes: performing matching between the one fingerprint image and a fingerprint template in the fingerprint template library; and determining that the one fingerprint image and any fingerprint template in the fingerprint template library are matched successfully.

In this embodiment, in the fingerprint verification situation, the electronic device obtains one fingerprint image for fingerprint matching, performs matching between the one fingerprint image and a fingerprint template in the fingerprint template library, and determines, when it is determined that any fingerprint template matches the one fingerprint image, that the one fingerprint image is matched successfully. It is determined, if it is determined that none of fingerprint templates matches the one fingerprint image, that the one fingerprint image is matched unsuccessfully.

In this embodiment, matching is performed on one obtained fingerprint image based on a fingerprint template in the fingerprint template library, which can effectively determine validity of the one fingerprint image.

With reference to the first aspect, in a possible design manner, the method further includes: storing each successfully matched fingerprint image into a temporary storage space of the electronic device.

In each fingerprint verification situation, the electronic device may store successfully matched fingerprint images into the temporary storage space in each fingerprint verification situation, to read the fingerprint images from the temporary storage space subsequently to determine an image type.

In this embodiment, the successfully matched fingerprint images are stored into a second storage space, an occupancy rate of a first storage space may be reduced, and the second storage space is a temporary storage space, and may be quickly accessed and read.

With reference to the first aspect, in a possible design manner, the fingerprint template library is stored into a permanent storage space of the electronic device.

In this embodiment, all fingerprint templates in the fingerprint template library are stored into a permanent storage space of the electronic device, and the fingerprint templates are improved in security and are not easily lost, thereby also increasing the fingerprint recognition rate to some extent.

With reference to the first aspect, in a possible design manner, the determining image types of the one or more fingerprint images includes: performing foreign matter comparison between the one fingerprint image and each fingerprint image matched successfully in a situation of preceding N times of fingerprint verification; and determining, if it is determined that the pattern of the foreign matter exists in a second quantity of consecutive fingerprint images including the one fingerprint image, that the second quantity of consecutive fingerprint images are the first type of images, where the pattern of the foreign matter is a same texture in a same fixed position in the plurality of fingerprint images; and the second quantity is greater than or equal to a second preset quantity.

In this embodiment, when the second storage space includes at least two fingerprint images, the electronic device may perform, according to a storage sequence, foreign matter comparison between one fingerprint image matched successfully this time and a fingerprint image matched successfully in a situation of each preceding time of fingerprint verification, thereby determining whether the pattern of the foreign matter exists in the fingerprint images. It is determined, if the electronic device determines that the pattern of the foreign matter exists in a second quantity of fingerprint images, that the second quantity of fingerprint images are the first type of images.

In this embodiment, in the fingerprint verification situation, the electronic device may perform comparison and recognition of the pattern of the foreign matter on the plurality of obtained fingerprint images, set a determination condition for a consecutive quantity, and determine, when it is determined that the pattern of the foreign matter exists in the second quantity of consecutive fingerprint images, that the second quantity of fingerprint images are the first type of images. The quantity condition in this embodiment increases recognition accuracy of the first type of images in the fingerprint verification situation. In addition, after the electronic device updates the marked first type of images to the fingerprint template library, the fingerprint image stored into the fingerprint template library may be cleared from the second storage space, and a storage resource of the second storage space may be released in time.

With reference to the first aspect, in a possible design manner, after the storing each successfully matched fingerprint image into a second storage space of the electronic device, the method further includes: determining that the one fingerprint image satisfies a fingerprint updating condition. That the fingerprint updating condition is satisfied includes: image quality of the fingerprint image satisfies a quality requirement, a valid fingerprint coverage area in the fingerprint image is greater than an area threshold, and a coupling extent between the fingerprint image and a fingerprint template in the fingerprint template library is greater than a coupling threshold, where that the image quality satisfies the quality requirement includes: a resolution of the fingerprint image is greater than a resolution threshold, and/or a contrast of the fingerprint image is greater than a contrast threshold.

In this embodiment, the electronic device may determine, according to the fingerprint updating condition, whether the successfully matched fingerprint images need to be updated to the fingerprint template library. The electronic device determines, when determining that the successfully matched fingerprint images satisfy the fingerprint updating condition, to update the successfully matched fingerprint images to the fingerprint template library.

Optionally, when it is determined that the successfully matched fingerprint images satisfy the fingerprint updating condition, the electronic device may execute an operation of determining an image type of the successfully matched fingerprint images. After the type of the successfully matched fingerprint images is determined, for example, if it is determined that the successfully matched fingerprint images are the first type of images, the first type of images are subject to foreign matter marking and then updated to the fingerprint template library; or in another example, if it is determined that the successfully matched fingerprint images are the second type of images, the second type of images are directly updated to the fingerprint template library.

In this embodiment, when it is determined that the successfully matched fingerprint images satisfy the fingerprint updating condition, the electronic device may update the one or more fingerprint images to the fingerprint template library, which can increase updating validity of the fingerprint template library.

With reference to the first aspect, in a possible design manner, if the pattern of the foreign matter is marked in a fingerprint template, the performing matching between the one fingerprint image and a fingerprint template in the fingerprint template library includes: performing matching between the one fingerprint image and an image region in the fingerprint template excluding the marked pattern of the foreign matter.

In this embodiment, in the fingerprint verification situation, the electronic device performs matching between one fingerprint image and all fingerprint templates in the fingerprint template library, and performs, if a fingerprint template is a fingerprint image in which the pattern of the foreign matter is marked, matching between the one fingerprint image and an image region in the fingerprint template excluding the marked pattern of the foreign matter, to obtain a matching result of the one fingerprint image.

In this embodiment, that the marked pattern of the foreign matter in the fingerprint template does not participate in fingerprint matching means that the pattern of the foreign matter does not affect matching results of other valid fingerprint regions, thereby increasing the fingerprint matching accuracy and the fingerprint recognition rate to some extent.

With reference to the first aspect, in a possible design manner, if the pattern of the foreign matter is not marked in a fingerprint template, the performing matching between the one fingerprint image and a fingerprint template in the fingerprint template library includes: performing matching between the one fingerprint image and a whole image region in the fingerprint template.

In this embodiment, in the fingerprint verification situation, the electronic device performs matching between one fingerprint image and all fingerprint templates in the fingerprint template library, and performs, if a fingerprint template is a fingerprint image in which the pattern of the foreign matter is not marked, matching between the one fingerprint image and a whole image region in the fingerprint template, to obtain a matching result of the one fingerprint image.

In this embodiment, if the pattern of the foreign matter is not marked in a fingerprint template, fingerprint matching is performed between the one fingerprint image and a whole image region in the fingerprint template, thereby increasing the fingerprint matching accuracy and the fingerprint recognition rate.

With reference to the first aspect, in a possible design manner, the method further includes: outputting prompt information if it is determined that the first type of images exist in the one or more fingerprint images, where the prompt information is used for prompting the user to clear the foreign matter in the fingerprint collection region.

In this embodiment, the electronic device may output the prompt information by displaying the prompt information on a display interface, or the electronic device may output the prompt information through voice broadcast.

If it is determined that the first type of images exist in the fingerprint images, that is, the electronic device determines that the pattern of the foreign matter exists in the obtained fingerprint images, that is, the electronic device determines that a foreign matter exists in the fingerprint collection region, the outputting, by the electronic device, the prompt information may effectively prompt the user to clear the foreign matter as soon as possible.

With reference to the first aspect, in a possible design manner, the image types include a second type of images, and the second type of images are fingerprint images other than the first type of images; and the method further includes: determining that the one or more fingerprint images include the second type of images, and updating the second type of images to the fingerprint template library.

In this embodiment, if the electronic device determines that the image types of the fingerprint images are the second type of images, that is, determines that the pattern of the foreign matter does not exist in the fingerprint images, the electronic device may directly update the fingerprint images to the fingerprint library. As reflected in the fingerprint input situation, the electronic device may directly input the fingerprint images to the fingerprint template library. As reflected in the fingerprint verification situation, the electronic device may update the fingerprint images to the fingerprint template library.

In this embodiment, while marking the pattern of the foreign matter for the first type of images, the electronic device may perform effective processing on the second type of images, without affecting processing on the second type of images, thereby increasing the entire fingerprint image processing capability.

According to a second aspect, an electronic device is provided. The electronic device has a function of implementing the method in the foregoing first aspect. The function may be implemented by hardware, or may be implemented by hardware by executing corresponding software. The hardware or the software includes one or more modules corresponding to the function.

According to a third aspect, an electronic device is provided. The electronic device includes a memory, a display screen, a fingerprint sensor, and one or more processors; the memory, the display screen, and the fingerprint sensor are coupled to the processor; and the memory stores computer program code, the computer program code includes computer instructions, and when the computer instructions are executed by the processor, the electronic device is enabled to perform the method according to any item in the foregoing first aspect.

According to a fourth aspect, a computer-readable storage medium is provided. The computer-readable storage medium stores instructions, and when the instructions are run on an electronic device, the electronic device is enabled to perform the method according to any item in the foregoing first aspect.

According to a fifth aspect, a computer program product including instructions is provided. When the instructions are run on an electronic device, the electronic device is enabled to perform the method according to any item in the foregoing first aspect.

It may be understood that for beneficial effects that can be achieved by the electronic device according to the second aspect, any possible design manner of the second aspect, the third aspect, and any possible design manner of the third aspect, the computer-readable storage medium according to the fourth aspect, and the computer program product according to the fifth aspect, refer to the beneficial effects according to the first aspect and any possible design manner of the first aspect. Details are not described herein again.

DESCRIPTION OF EMBODIMENTS

In the following descriptions, the terms "first" and "second" are used merely for the purpose of description, and shall not be construed as indicating or implying relative importance or implicitly indicating a quantity of indicated technical features. Therefore, features defined with "first" and "second" may explicitly or implicitly include one or more of the features. In the description of an embodiment herein, unless otherwise specified, "a plurality of" means two or more.

A fingerprint recognition method provided in an embodiment herein is applied to a fingerprint recognition situation of an electronic device. Usually, the fingerprint recognition situation includes a fingerprint input process and a fingerprint unlocking process.

In a fingerprint input situation, the electronic device collects a fingerprint image of a user in a fingerprint collection region, and inputs, when determining that the fingerprint image satisfies a fingerprint input requirement, the fingerprint image to a fingerprint template library of the electronic device.

Figure 1:
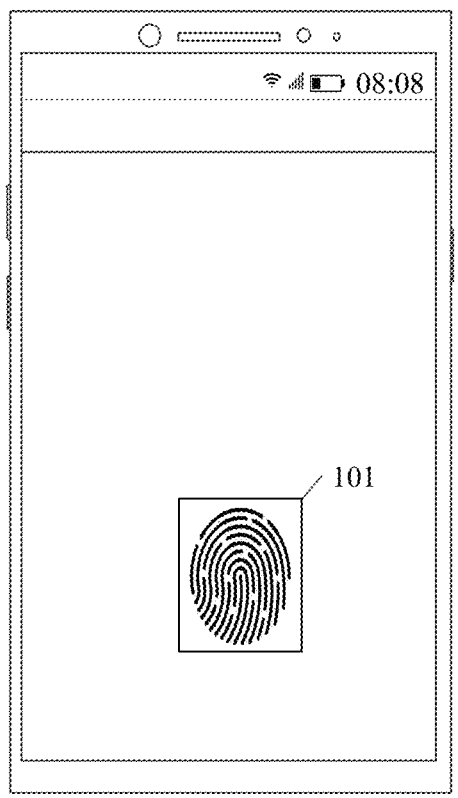
FIG. 1 is a schematic diagram of a fingerprint collection region of an electronic device according to an embodiment of this application.
Figure 2:
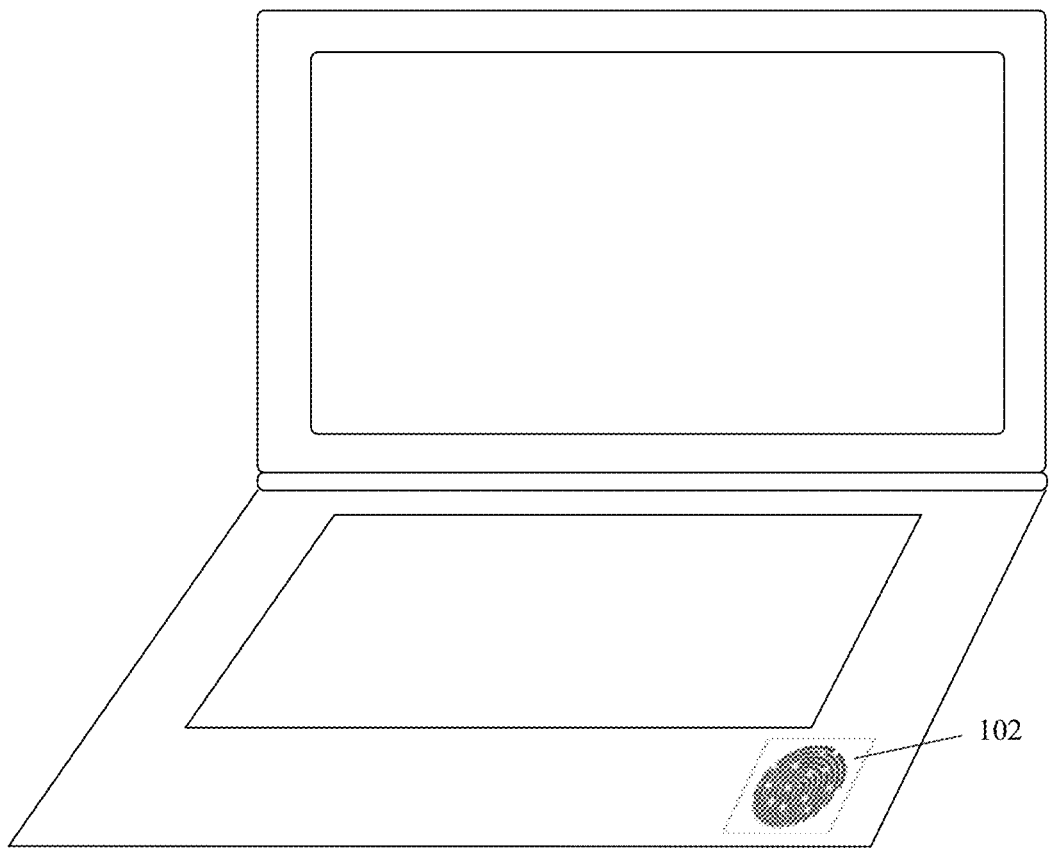
FIG. 2 is a schematic diagram of a fingerprint collection region of another electronic device according to an embodiment of this application.

Optionally, the fingerprint collection region of the electronic device may be a specified region on a display screen of the electronic device. For example, reference may be made to FIG. 1. FIG. 1 gives an example in which when an electronic device is a mobile phone, a fingerprint collection region is a specified region 101 on a display screen. Alternatively, the fingerprint collection region may be a specified region on a body of the electronic device. For example, the specified region may be a lateral specified region or a back specified region of the electronic device or another specified region on the body. For example, the another specified region on the body may be a home button of the mobile phone. Reference may be made to FIG. 2. FIG. 2 gives an example in which when an electronic device is a notebook computer, a fingerprint collection region is a specified region 102 on a body. For the electronic device including a fingerprint sensor, regions in which the fingerprint collection region and the fingerprint sensor are located correspond to each other. The electronic device collects a fingerprint image in the fingerprint collection region, and the size of the fingerprint image is consistent with the size of the fingerprint collection region.

Usually, in a fingerprint image collection process, to ensure integrity of collected fingerprint images, the electronic device needs to collect fingerprint images for a plurality of times from different angles of a user's finger or different press positions of a finger in the fingerprint collection region. Usually, in a fingerprint input process, a quantity threshold of collection times of the electronic device may be 30, 60, 80, or the like, and a specific quantity threshold of collection times is determined according to the actual electronic device. It should be noted that the quantity of collection times of the electronic device herein is different from the quantity of press times of the user. For example, the electronic device may collect fingerprint images for a plurality of times in a period of time for which the user presses once.

In a process of collecting fingerprint images for a plurality of times, the electronic device needs to determine a fingerprint input condition for fingerprint images collected each time, and stores a fingerprint image satisfying the fingerprint input condition into the fingerprint template library. Because of a device difference between fingerprint sensors in the electronic device, a collected original fingerprint image may have an original quality problem. Before determining the fingerprint input condition, the electronic device may further perform image preprocessing on the collected original fingerprint image, for example, perform image enhancement processing or image binarization processing on the original fingerprint image. Therefore, the electronic device determines the fingerprint input condition for the preprocessed fingerprint image. The fingerprint input condition refers to a control condition for image quality of a fingerprint image. For example, the fingerprint input condition includes at least one of that an image resolution of a fingerprint image satisfies a resolution threshold, an image contrast of a fingerprint image satisfies a contrast threshold, a valid fingerprint coverage area of a fingerprint image satisfies an area threshold, and the like. In a conventional situation, after determining that a fingerprint image satisfies the fingerprint input condition, the electronic device stores the fingerprint image into the fingerprint template library. The valid fingerprint coverage area herein refers to an area on a fingerprint image that is occupied by a finger fingerprint and that is not covered by a pattern of a foreign matter in the fingerprint image.

Figure 3:
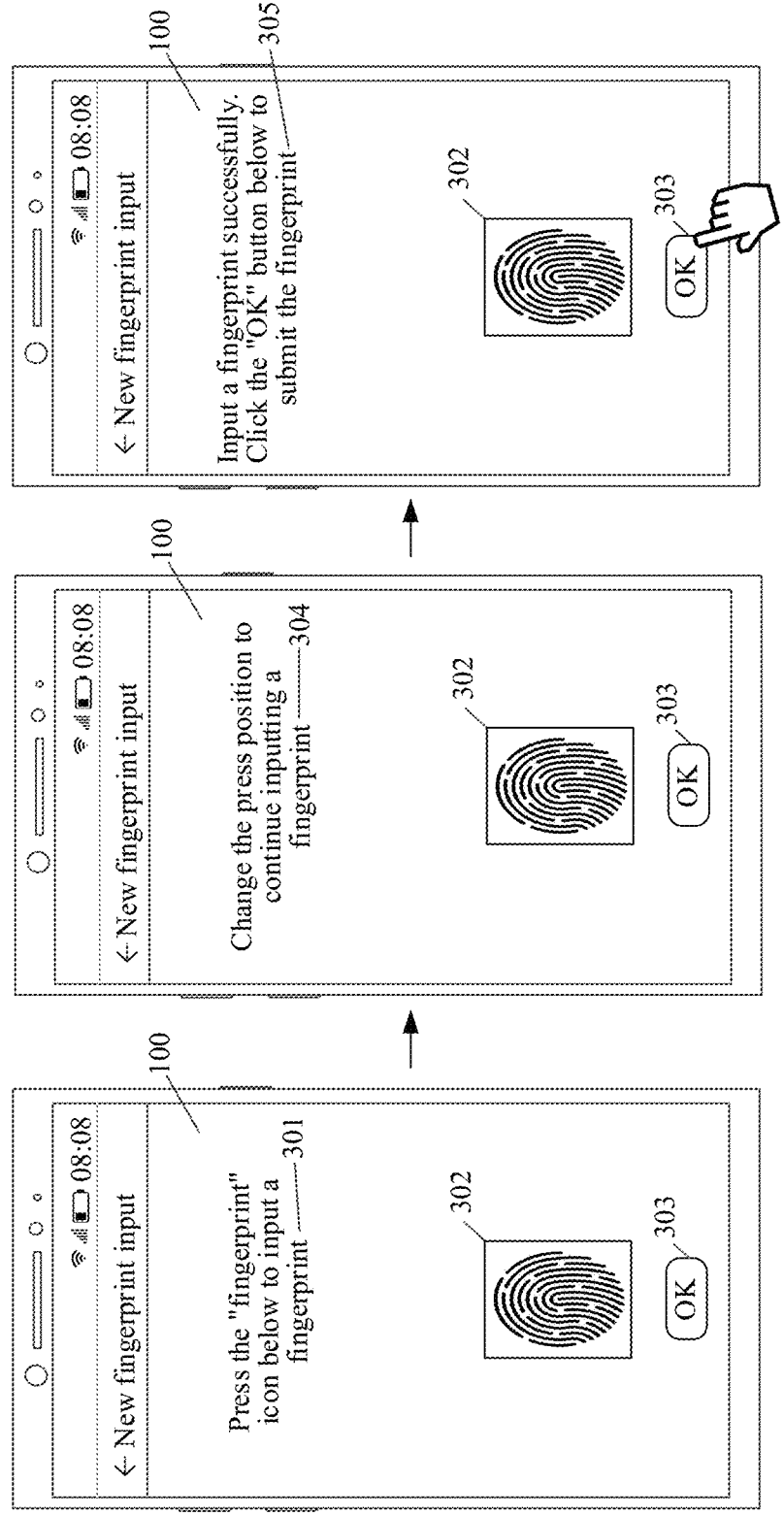
FIG. 3 is a schematic diagram of an interface in a fingerprint input process of an electronic device according to an embodiment of this application.

In a fingerprint input situation, the user may select fingerprint input through a menu interface to trigger the electronic device to enter a fingerprint input interface; or the user may trigger, through voice control or another customized operation, the electronic device to execute a fingerprint input action. Description is made using FIG. 3 as an example. FIG. 3 gives an example of fingerprint input based on a display screen of a mobile phone. For example, a fingerprint input interface 100 includes first prompt information 301, a "fingerprint" icon 302, and an "OK" button 303.

The "fingerprint" icon 302 is used for indicating a region for collecting a fingerprint image, and a user may place a finger in the region in which the "fingerprint" icon 302 is located to execute a press operation to input a fingerprint. The first prompt information 301 is used for prompting the user to perform fingerprint input. Optionally, in an interface position in which the first prompt information 301 is located, the mobile phone may further display other prompt information. For example, reference is made to FIG. 3. FIG. 3 gives a schematic diagram of an entire process in which the user performs fingerprint input. When no fingerprint image is collected, the mobile phone displays, in the interface 100, the first prompt information 301 used for prompting the user to input a fingerprint, and the first prompt information 301 is "press a region of the "fingerprint" icon below to input a fingerprint"; in a fingerprint image collection process, the mobile phone may display, in the interface 100, second prompt information 304 used for prompting the user to change a finger position or angle to continue performing fingerprint input, where the second prompt information 301 may be "change a press position to continue input fingerprint"; and when an actual quantity of collection times reaches a quantity threshold of collection times, that is, the user completes a fingerprint input action, the mobile phone may further display, in the interface 100, third prompt information 305 used for prompting the user to complete a fingerprint input operation. For example, the third prompt information 305 may be "input a fingerprint successfully, and click an "OK" button below to submit the fingerprint". After the user clicks the "OK" button 303, the electronic device is triggered to terminate the current fingerprint image collection operation.

Figure 4:
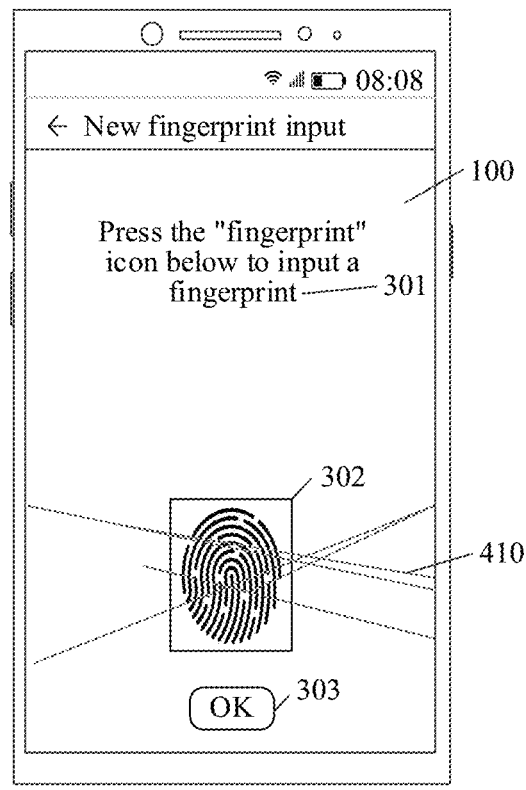
FIG. 4 is a schematic diagram of an interface on which a foreign matter exists in a fingerprint collection region of an electronic device according to an embodiment of this application.

In actual life, in the fingerprint collection region of the electronic device, there may be foreign matters such as a hairline, a copper wire, or a crack or scratch on a screen or screen protector, or a protective film with a texture stuck to the fingerprint collection region. Particularly, the foreign matters that are not easy to clear such as the crack or scratch on the screen and the crack or scratch on the screen protector affect fingerprint image collection. For example, FIG. 4 gives an example in which a screen crack 410 exists in a fingerprint collection region 101. Obviously, some screen cracks exist in the fingerprint collection region 101. Because the screen crack 410 causes damage to the fingerprint collection region, a fingerprint that is collected in a position of the screen crack 410 in a fingerprint image cannot be recognized, to finally lead to a fingerprint input failure.

Figure 5:
FIG. 5 is a schematic diagram of an interface of a fingerprint image in which a pattern of a foreign matter exists and that is collected by an electronic device according to an embodiment of this application.

In an implementation of the conventional technology, a finger texture and a non-finger texture (foreign matter) are identified and distinguished through algorithm training. In a process in which the user executes fingerprint input, a finger texture and a non-finger texture are determined for a collected fingerprint image of the user. If it is determined for a plurality of times that the collected fingerprint image includes the non-finger texture, that is, if it is determined that the fingerprint image includes a pattern of a foreign matter, the fingerprint image including the pattern of the foreign matter is considered as an invalid image. In this case, input is directly terminated, which leads to a fingerprint input failure. In a fingerprint image collection situation, based on the case given in FIG. 4 that the screen crack 410 exists on the screen of the mobile phone, a pattern corresponding to some screen cracks exists in the fingerprint image collected by the mobile phone. For example, FIG. 5 gives a schematic diagram of a collected fingerprint image including a pattern 510 for some screen cracks. Based on the existing fingerprint input technology, if the mobile phone collects a fingerprint image similar to FIG. 5 in which a pattern of a foreign matter exists, and determines that the pattern of the foreign matter exists in the fingerprint image, the mobile phone determines that the fingerprint image is an invalid image, discards the fingerprint image, and terminates an operation of collecting fingerprint images of the user. As a result, the user cannot normally perform fingerprint input, which not only poses a problem of poor experience to the user, but also poses some risks to the mobile phone of the user in terms of security.

For the problem existing in the foregoing existing technology, in a situation in which a foreign matter exists in a fingerprint collection region during fingerprint input, an embodiment of this application provides a fingerprint recognition method, where an electronic device collects fingerprint images in the fingerprint collection region, determines a fingerprint input condition for the fingerprint images, performs image comparison between a plurality of fingerprint images satisfying the fingerprint input condition, marks, if it is determined that the pattern of the foreign matter exists in each of a preset quantity of fingerprint images, the pattern of the foreign matter, and inputs the fingerprint images with the marked pattern of the foreign matter to a fingerprint template library of the electronic device, to complete a fingerprint input operation. It should be noted that the marked pattern of the foreign matter does not participate in fingerprint matching.

Based on the fingerprint recognition method of this embodiment, in a fingerprint input process, the pattern of the foreign matter in the fingerprint images satisfying the fingerprint input condition is marked, and the marked fingerprint images are input to the fingerprint template library. Therefore, although the foreign matter exists in the fingerprint recognition region, the fingerprint images satisfying the fingerprint input condition can still be input to the fingerprint template library. Different from the existing technology in which the fingerprint input operation is terminated as long as the pattern of the foreign matter is recognized, the fingerprint recognition method of this embodiment reduces the fingerprint input failure rate and improves the user experience to some extent.

In a fingerprint unlocking situation, the electronic device collects fingerprint images of the user in the fingerprint collection region, performs matching between the collected fingerprint images and fingerprint templates in the fingerprint template library, and executes a fingerprint unlocking operation when it is determined that the matching is successful. The fingerprint templates in the fingerprint template library refer to all fingerprint images that are input in the fingerprint input process. It should be noted that the fingerprint collection region in the fingerprint unlocking situation is consistent with the fingerprint collection region in the fingerprint input situation.

The fingerprint unlocking situation may include situations such as lock-screen interface unlocking and application unlocking of the electronic device. The lock-screen interface unlocking means that the electronic device is in a lock-screen interface, collects a fingerprint image of the user, and enters a system home screen of the electronic device when the fingerprint image is matched successfully. The application unlocking includes situations such as unlocking of an encryption application and payment unlocking. For example, when an unlocking operation on the encryption application is triggered, the electronic device collects a fingerprint image of the user, and enters an unlocking home screen of the application when the fingerprint image is matched successfully. For example, when payment unlocking is triggered, the electronic device collects a fingerprint image of the user, and executes a payment operation when the fingerprint image is matched successfully.

In a fingerprint unlocking process, similar to a fingerprint input process, the electronic device similarly performs image preprocessing on a collected fingerprint image, and performs matching between the preprocessed fingerprint image and fingerprint templates in the fingerprint template library; considers, if a fingerprint template matches the fingerprint image, that the collected fingerprint image is a fingerprint image of the input fingerprint, and executes an unlocking operation; and considers, if none of the fingerprint templates matches the fingerprint image, that the collected fingerprint image is not a fingerprint image of the input fingerprint, and does not respond to the unlocking operation.

In a situation in which a foreign matter exists in the fingerprint collection region, based on a fingerprint input algorithm provided in the existing technology, in the existing technology, when the pattern of the foreign matter existing in a fingerprint image is recognized, the fingerprint image in which the pattern of the foreign matter exists is discarded, and then the electronic device performs a link of matching between a fingerprint image and a fingerprint template. Because a fingerprint template including the pattern of the foreign matter does not exist in the fingerprint template library, that is, a fingerprint template matching the fingerprint image always does not exist in the fingerprint template library, the electronic device considers that the fingerprint image in which the pattern of the foreign matter exists is a non-input fingerprint image, and always does not respond to the unlocking operation. That is to say, in the existing technology, as long as the collected fingerprint image includes the pattern of the foreign matter, unlocking cannot be performed regardless of whether the collected fingerprint image is a fingerprint image of the input finger. For example, when a crack occurs on the screen of the mobile phone of the user, the user cannot unlock the mobile phone of the user, which causes huge inconvenience to the user. Even in some cases, because no fingerprint template including the pattern of the foreign matter exists in the fingerprint template library, when the foreign matter exists in the fingerprint collection region, the pattern of the foreign matter affects a valid fingerprint in a fingerprint image, leading to reduction in the coverage area of the valid fingerprint in the collected fingerprint image. In the existing technology, matching is performed based on a few valid fingerprints, and a matching success case may occur. As a result, a non-input finger may also be used for successfully performing fingerprint unlocking when a foreign matter exists in the fingerprint collection region, to cause a security problem of the electronic device.

However, in the fingerprint unlocking method in the fingerprint recognition method provided in the embodiments of this application, the fingerprint template library is obtained based on the foregoing fingerprint input method. Because the fingerprint template library has a fingerprint template in which the pattern of the foreign matter is marked, and none of the pattern of the foreign matter marked in the fingerprint template participates in fingerprint matching, that is to say, in a fingerprint matching link of performing fingerprint unlocking, regardless of whether the pattern of the foreign matter exists or does not exist in a fingerprint image collected by the electronic device, the electronic device performs matching between the fingerprint image and a valid fingerprint in the fingerprint template, without being affected by the pattern of the foreign matter, and considers the collected fingerprint image as an input fingerprint image when the valid fingerprint is matched successfully, thereby executing an unlocking operation. For example, when a crack occurs on the screen of the mobile phone of the user, the mobile phone performs fingerprint matching based on a valid fingerprint in a collected fingerprint image other than the crack, thereby enabling the user to still unlock the mobile phone of the user through the fingerprint, to increase the fingerprint unlocking success rate and improve the user experience. In addition, in this embodiment, a foreign matter may be effectively recognized and marked, and matching is performed for a valid fingerprint other than the pattern of the foreign matter, thereby avoiding a case that erroneous unlocking is performed with a non-input fingerprint in which the pattern of the foreign matter exists, and improving security of the electronic device.

An embodiment of this application provides a fingerprint recognition method applicable to any electronic device including a fingerprint recognition module, such as a mobile phone, a tablet computer, a notebook computer, an ultra-mobile personal computer (ultra-mobile personal computer, UMPC), a handheld computer, a netbook, a personal digital assistant (personal digital assistant, PDA), a wearable electronic device (for example, a smartwatch, smart glasses, or a smart helmet), a virtual reality device, a smart home device, a vehicle-mounted computer, or an access control device, which are not limited in this embodiment of this application.

Figure 6:
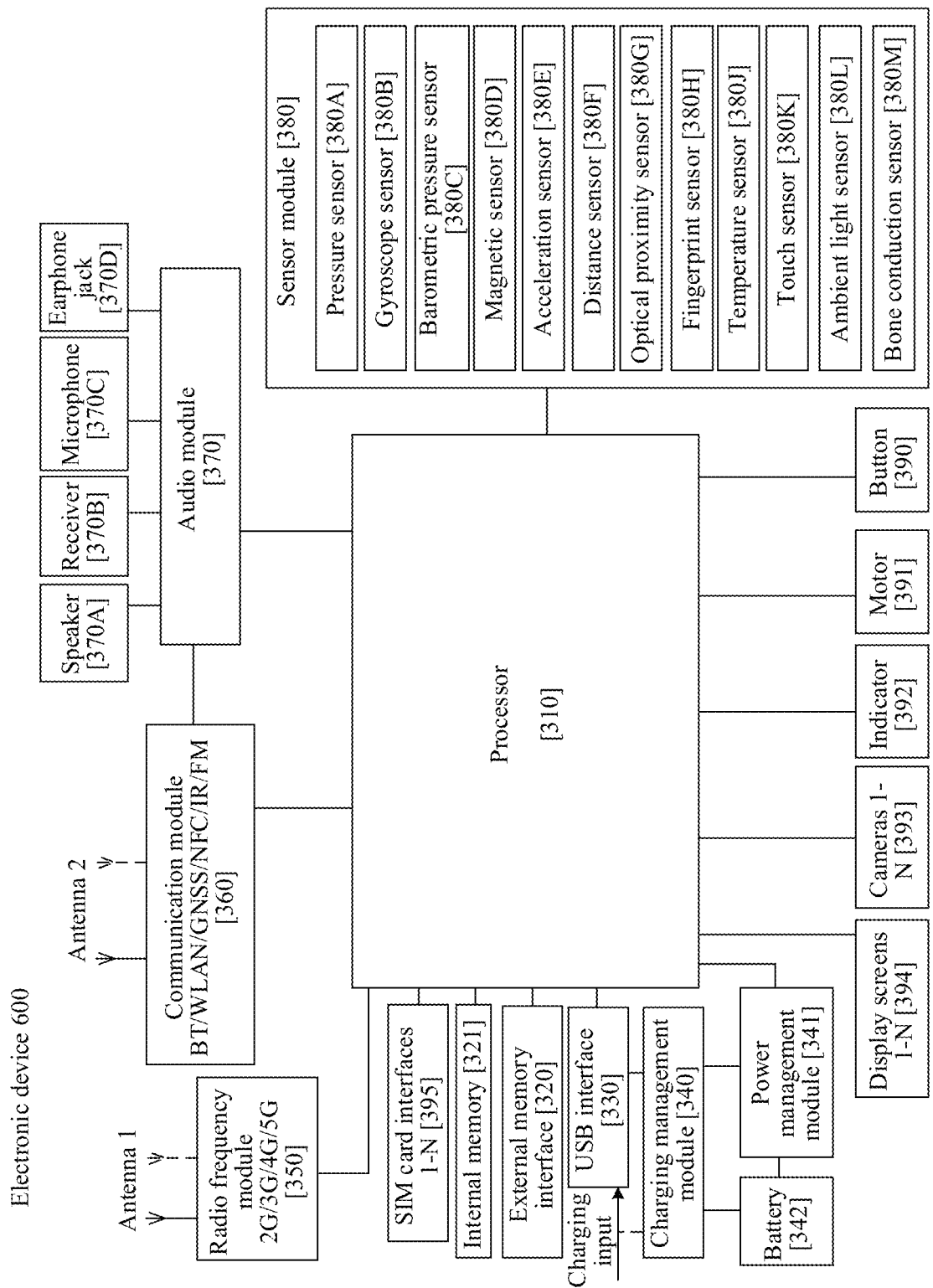
FIG. 6 is a schematic diagram of a hardware structure of an electronic device according to an embodiment of this application.

FIG. 6 is a block diagram of a structure of an electronic device (for example, an electronic device 600) according to an embodiment of this application. The electronic device 600 may include a processor 310, an external memory interface 320, an internal memory 321, a universal serial bus (universal serial bus, USB) interface 330, a charging management module 340, a power management module 341, a battery 342, an antenna 1, an antenna 2, a radio frequency module 350, a communication module 360, an audio module 370, a speaker 370A, a telephone receiver 370B, a microphone 370C, a headset jack 370D, a sensor module 380, a button 390, a motor 391, an indicator 392, a camera 393, a display screen 394, a subscriber identity module (subscriber identity module, SIM) card interface 395, and the like. The sensor module 380 may include a pressure sensor 380A, a gyroscope sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, and a bone conduction sensor 380M.

The structure shown in this embodiment of the present invention does not constitute a limitation on the electronic device 600. The electronic device may include more or fewer components than those shown in the figure, or combine some components, or split some components, or have different component arrangements. The illustrated components may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components, or may be integrated into one or more processors.

The controller may be a nerve center and a command center of the electronic device 600, and be a nerve center and a command center of the electronic device 600. The controller generates an operation control signal based on instruction operation code and a timing signal, to control instruction fetching and instruction execution.

A memory may be further configured in the processor 310, to store an instruction and data. In some embodiments, the memory in the processor 310 is a cache, and may store an instruction or data that is recently used or cyclically used by the processor 310. If the processor 310 needs to use the instructions or the data again, the processor may directly invoke the instructions or the data from the memory. This avoids repeated accessing and reduces a wait time for the processor 310, thereby improving system efficiency.

In some embodiments, the processor 310 may include interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, and/or a USB interface or the like.

An interface connection relationship between the modules shown in embodiments of the present invention is merely an example for description, and does not constitute a limitation on the structure of the electronic device 600. The electronic device 600 may adopt an interface connection manner different from that in this embodiment of the present invention, or adopt a combination of a plurality of interface connection manners.

The charging management module 340 is configured to receive a charging input from the charger. The charger may be a wireless charger, or may be a wired charger. In some embodiments of wired charging, the charging management module 340 may receive a charging input from the wired charger through the USB interface 330. In some embodiments of wireless charging, the charging management module 340 may receive a wireless charging input through a wireless charging coil of the electronic device 600. The charging management module 340 may supply power to the electronic device 600 by using the power management unit 341 while charging the battery 342.

The power management module 341 is configured to connect to the battery 342, the charging management module 340, and the processor 310. The power management module 341 receives input of the battery 342 and/or the charging management module 340, to supply power to the processor 310, the internal memory 321, the external memory interface 320, the display screen 394, the camera 393, the communication module 360, and the like. The power management module 341 may be further configured to monitor parameters such as a battery capacity, a battery cycle count, and a battery health status (leakage or impedance). In some embodiments, the power management module 341 may be alternatively arranged in the processor 310. In some embodiments, the power management module 341 and the charging management module 340 may be alternatively arranged in a same component.

The wireless communication function of the electronic device 600 can be implemented by using the antenna 1, the antenna 2, the radio frequency module 350, the communication module 360, the modem, the baseband processor, and the like.

The antenna 1 and the antenna 2 are configured to transmit and receive electromagnetic wave signals. Each antenna of the electronic device 600 may be configured to cover one or more communication bands. Different antennas may also be reused to improve antenna utilization. For example, a cellular antenna may be reused as a diversity antenna of a wireless local area network. In some embodiments, the antenna may be used in combination with a tuning switch.

The radio frequency module 350 may be a communication processing module for providing a solution to wireless communication including 2G/3G/4G/5G and the like applied to the electronic device 600. The radio frequency module 350 may include at least one filter, a switch, a power amplifier, and a low noise amplifier (low noise amplifier, LNA). The radio frequency module 350 receives an electromagnetic wave through the antenna 1, performs processing such as filtering or amplification on the received electromagnetic wave, and sends a processed electromagnetic wave to the modem for demodulation. The radio frequency module 350 may further amplify a signal modulated by the modem, and convert the signal into an electromagnetic wave through the antenna 1 for transmission. In some embodiments, at least some functional modules of the radio frequency module 350 may be arranged in the processor 310. In some embodiments, at least some functional modules of the radio frequency module 350 and at least some modules of the processor 310 may be arranged in a same component.

The modem may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers, to the baseband processor for processing, the low-frequency baseband signal obtained through demodulation. The low-frequency baseband signal is processed by the baseband processor and then transferred to an application processor. The application processor outputs a sound signal through an audio device (not limited to the speaker 370A, the receiver 370B, or the like), or displays an image or a video through the display screen 394. In some embodiments, the modem may be an independent device. In some embodiments, the modem may be independent of the processor 310, and be arranged in a same device as the radio frequency module 350 or another functional module.

The communication module 360 may be a communication processing module for providing a solution to wireless communication applied to the electronic device 600, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The communication module 360 may be one or more devices that integrate at least one communication processing module. The communication module 360 receives an electromagnetic wave through the antenna 2, modulates and filters an electromagnetic wave signal, and sends a processed signal to the processor 310. The communication module 360 may further receive a to-be-sent signal from the processor 310, perform frequency modulation and amplification on the signal, and convert the signal into an electromagnetic wave through the antenna 2 for radiation.

In some embodiments, the antenna 1 and the radio frequency module 350 of the electronic device 600 are coupled, and the antenna 2 and the communication module 360 are coupled, so that the electronic device 600 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), the BT, the GNSS, the WLAN, the NFC, the FM, the IR technology, and/or the like. The GNSS may include a global positioning system (satellite based augmentation systems, SBAS), a global navigation satellite system (global navigation satellite system, GLONASS), a Beidou navigation satellite system (beidou navigation satellite system, BDS), a quasi-zenith satellite system (quasi-zenith satellite system, QZSS) and/or a satellite based augmentation system (satellite based augmentation systems, SBAS).

The electronic device 600 may implement a display function through the GPU, the display screen 394, the application processor, and the like. The GPU is an image processing microprocessor and is connected to the display screen 394 and the application processor. The GPU is configured to perform mathematical and geometric calculation for graphics rendering. The processor 310 may include one or more GPUs, and the GPU executes a program instruction to generate or change display information.

The display screen 394 is configured to display an image, a video, or the like. For example, in this embodiment, in a fingerprint input situation, the display screen 394 may display prompt information used for prompting a user to start inputting a fingerprint, or display prompt information used for prompting the user to change an angle and continue inputting a fingerprint, or display prompt information used for prompting the user to complete fingerprint input. In a fingerprint unlocking situation, the display screen 394 may further display prompt information used for prompting the user that unlocking fails. In a fingerprint input or fingerprint unlocking situation, if a foreign matter exists in a fingerprint collection region, the display screen may further display prompt information used for prompting the user to clear the foreign matter, or other prompt information. The display screen 394 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device 600 may include one or N display screens 394, and N is a positive integer greater than 1.

The electronic device 600 may implement a shooting function by using the ISP, the camera 393, the video codec, the GPU, the display screen, the application processor, and the like.

The NPU is a neural-network (neural-network, NN) computing processor that quickly processes input information by referring to a biological neural-network structure, for example, by referring to a transfer mode between human brain neurons, and can further perform self-learning continuously. Applications such as intelligent recognition of the electronic device 600 can be implemented by using the NPU, for example, image recognition, facial recognition, speech recognition, and text understanding. In this embodiment, the NPU may be configured to perform operations such as fingerprint image recognition, fingerprint image matching, and the like.

The external memory interface 320 may be configured to connect to an external storage card, such as a Micro SD card, to extend a storage capability of the electronic device 600. The external memory card communicates with the processor 310 through the external memory interface 320, to implement a data storage function, for example, store files such as music and a video into the external memory card.

The internal memory 321 may be configured to store computer-executable program code, and the executable program code includes instructions. The processor 310 performs various function applications and data processing of the electronic device 600 by running the instructions stored in the internal memory 321. The memory 121 may include a program storage region and a data storage region. The program storage region may store an operating system, an application required by at least one function (such as a voice playing function and an image playing function), and the like. The data storage region may store data (for example, audio data and an address book) and the like created when the electronic device 600 is used. In addition, the memory 121 may include a high-speed random access memory, and may alternatively include a non-volatile memory, for example, at least one magnetic disk storage device, a flash memory device, another volatile solid-state memory, or a universal flash storage (universal flash storage, UFS).

The electronic device 600 may implement an audio function, for example, music playback or recording, by using the audio module 370, the speaker 370A, the phone receiver 370B, the microphone 370C, the headset jack 370D, the application processor, and the like.

The audio module 370 is configured to convert digital audio information into an analog audio signal for output, and is further configured to convert an analog audio input into a digital audio signal. The audio module 370 may also be configured to encode and decode audio signals. In some embodiments, the audio module 370 may be arranged in the processor 310, or some functional modules of the audio module 370 are arranged in the processor 310.

The speaker 370A, also referred to as a "horn", is configured to convert an electrical audio signal into a sound signal. In this embodiment, the speaker 370A may further output prompt audio. For example, in a fingerprint input or fingerprint unlocking situation, if the electronic device 600 determines that a foreign matter exists in a fingerprint collection region, prompt audio used for prompting the user to clear the foreign matter may be output through the speaker 370A; or in a case that fingerprint input fails or fingerprint unlocking fails, the electronic device 600 may output, through the speaker 370A, prompt audio used for prompting the user that fingerprint input fails or fingerprint unlocking fails; or in a case that fingerprint unlocking fails, the electronic device 600 may further output, through the speaker 370A, alarm audio used for prompting the user that an unlocking risk exists. Moreover, the electronic device 600 may listen to music or answer a call in a hands-free mode by using the speaker 370A.

The receiver 370B, also referred to as a "handset", is configured to convert an electrical audio signal into a sound signal. When a call is answered or a voice message is received through the electronic device 600, the receiver 370B may be put close to a human ear to listen to a voice.

The microphone 370C, also referred to as a "microphone" or a "microphone", is configured to convert a sound signal into an audio electrical signal. When making a call or sending voice information, the user may make a sound near the microphone 370C through the mouth of the user, to input a sound signal into the microphone 370C. At least one microphone 370C may be arranged in the electronic device 600. In some embodiments, two microphones 370C may be arranged in the electronic device 600, to collect a sound signal and also implement a noise reduction function. In some embodiments, three, four, or more microphones 370C may be alternatively arranged in the electronic device 600, to collect a sound signal, implement noise reduction, recognize a sound source, implement a directional recording function, and the like.

The headset jack 370D is configured to connect to a wired headset. The headset jack 370D may be a USB interface 330, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 380A is configured to sense a pressure signal and may convert the pressure signal into an electrical signal. In some embodiments, the pressure sensor 380A may be arranged in the display screen 394. There are a plurality of types of pressure sensors 380A, such as a resistive pressure sensor, an inductive pressure sensor, and a capacitive pressure sensor. The capacitive pressure sensor may include at least two parallel plates with conductive a material. When force is exerted on the pressure sensor, capacitance between electrodes changes. The electronic device 600 determines an intensity of the pressure based on the change in the capacitance. When a touch operation is performed on the display screen 394, the electronic device 600 detects strength of the touch operation by using the pressure sensor 380A. The electronic device 600 may also calculate a touch location based on a detected signal of the pressure sensor 380A. In some embodiments, touch operations that are performed on a same touch position but have different touch operation intensity may correspond to different operation instructions. For example, when a touch operation whose touch operation strength is less than a first pressure threshold is performed on an SMS message application icon, an instruction of checking an SMS message is executed. When a touch operation whose touch operation intensity is greater than or equal to the first pressure threshold is performed on the short message application icon, an instruction of creating a new short message is executed.

The optical proximity sensor 380G may include, for example, a light emitting diode (LED) and an optical detector such as a photodiode. The light-emitting diode may be an infrared light-emitting diode. Infrared light may be emitted by using the light-emitting diode. Infrared reflected light from a nearby object is detected by using the photodiode. When sufficient reflected light is detected, it may be determined that an object exists near the electronic device 600. When insufficient reflected light is detected, it may be determined that there is no object near the electronic device 600. The electronic device 600 may detect, by using the optical proximity sensor 380G, that the user holds the electronic device 600 close to the ear, so as to automatically turn off the screen to save power. The optical proximity sensor 380G may also be used in a smart cover mode or a pocket mode to automatically perform screen unlocking or locking.

The ambient light sensor 380L is configured to sense ambient light brightness. The electronic device 600 may adaptively adjust brightness of the display screen based on the sensed the ambient light brightness. The ambient light sensor 380L may also be configured to automatically adjust white balance during photographing. The ambient light sensor 380L may also cooperate with the optical proximity sensor 380L to detect whether the electronic device 600 is in a pocket to prevent a false touch.

The fingerprint sensor 380H is configured to collect a fingerprint. The electronic device 600 may implement fingerprint unlocking, application lock accessing, fingerprint-based photographing, fingerprint-based call answering, and the like by using a feature of the collected fingerprint. In some embodiments, the fingerprint sensor 380H transmits a collected fingerprint image to the processor, and the processor performs an operation of fingerprint input or fingerprint unlocking according to the fingerprint image. Optionally, the fingerprint sensor 380H may be an optical fingerprint sensor, a capacitive fingerprint sensor, an ultrasonic fingerprint sensor, or the like. In this embodiment, the fingerprint sensor may be arranged in an in-screen position on the display screen of the electronic device or arranged in a specified position on the body of the electronic device, and the position in which the fingerprint sensor is arranged corresponds to the fingerprint collection region. For example, with reference to FIG. 1, the fingerprint sensor is arranged in an in-screen position on the display screen of the mobile phone, and a fingerprint collection region corresponding to the in-screen position is the region 101. For example, with reference to FIG. 2, the fingerprint sensor is arranged in a specified position on the body of the notebook computer, and a fingerprint collection region corresponding to the specified position is the region 102. The fingerprint sensor may be further arranged in a lateral specified position, a back specified position, or the like on the electronic device. The arrangement position of the fingerprint sensor may be determined according to an unlocking habit of the user during use of the electronic device. This is not limited in this embodiment.

The touch sensor 380F is also referred to as a "touch panel", may be arranged in the display screen 394, is configured to detect a touch operation performed on or near the touch sensor, and may transmit the detected touch operation to the application processor, to determine a type of a touch event and provide a corresponding visual output by using the display screen 394.

The software system of the electronic device 600 may use a layered architecture, an event-driven architecture, a microcore architecture, a microservice architecture, or a cloud architecture. In the embodiments of the present invention, an Android system of a layered architecture is used as an example to describe a software structure of the electronic device 600.

Figure 7:
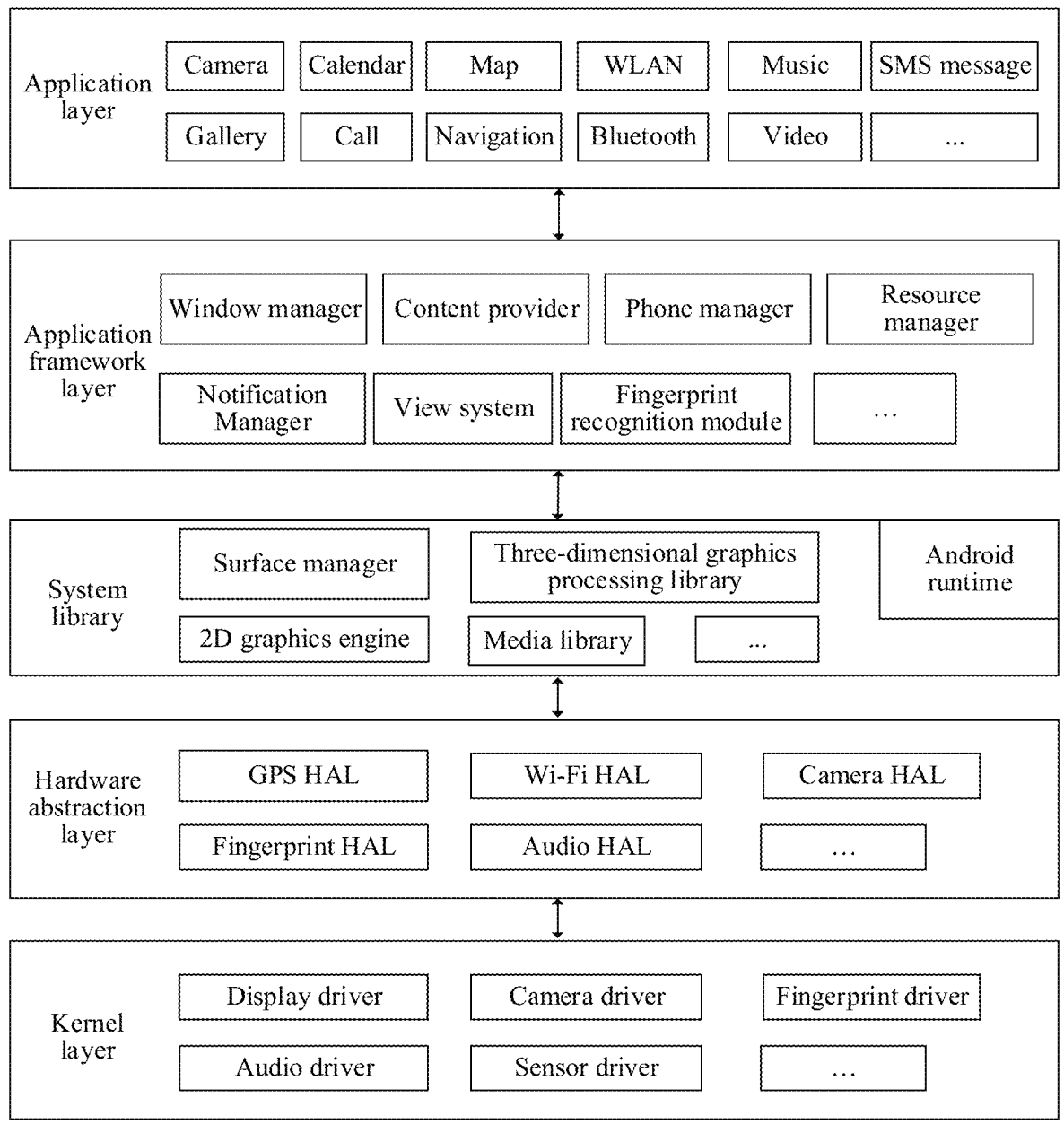
FIG. 7 is a schematic diagram of a software structure of an electronic device according to an embodiment of this application.

FIG. 7 is a block diagram of a software structure of an electronic device 600 according to an embodiment of the present invention. A layered architecture divides software into several layers, with each layer having a clear role and responsibilities. The layers communicate with each other through software interfaces. In some embodiments, the Android system is divided into five layers that are respectively an application layer, an application framework layer, an Android runtime (Android runtime) and system library, a hardware abstraction layer, and a kernel layer from top to bottom.

The application program layer may include a series of application program packages.

As shown in FIG. 7, the application packages may include applications such as camera, photos, calendar, phone (that is, a "phone" application in this embodiment of this application), maps, navigation, WLAN, Bluetooth, music, videos, and SMS messages.

The application framework layer provides an application programming interface (application programming interface, API) and a programming framework for the applications at the application layer. The application framework layer includes some predefined functions. As shown in FIG. 7, the application program framework layer may include a window manager, a content provider, a view system, a phone manager, a resource manager, a notification manager, and a fingerprint recognition module.

The fingerprint recognition module is configured to perform operations such as image preprocessing, image determination, image matching, foreign matter marking, fingerprint template library updating, and the like on a fingerprint image. After receiving a fingerprint image, the fingerprint recognition module performs preprocessing such as image enhancement, image binarization, and the like on the fingerprint image. In a fingerprint input situation, the fingerprint recognition module determines whether the preprocessed fingerprint image satisfies a fingerprint input condition, and recognizes the pattern of the foreign matter for the fingerprint image when it is determined that the fingerprint image satisfies the fingerprint input condition; and marks the pattern of the foreign matter if the pattern of the foreign matter exists in the fingerprint image, and inputs the fingerprint image with the marked pattern of the foreign matter to the fingerprint template library. In a fingerprint unlocking situation, the fingerprint recognition module performs image matching on the preprocessed fingerprint image, performs matching between the fingerprint images and fingerprint templates in the fingerprint template library, and executes a fingerprint unlocking operation when the matching is successful. In a fingerprint template updating situation, the fingerprint recognition module recognizes a foreign matter for a fingerprint image satisfying a template updating condition, and updates the fingerprint image to the fingerprint template library when the pattern of the foreign matter does not exist; and marks, when it is determined that the pattern of the foreign matter exists in each of a consecutive quantity of fingerprint images, the pattern of the foreign matter in the fingerprint images, and updates the fingerprint images with the marked pattern of the foreign matter to the fingerprint template library.

The window manager is configured to manage a window application. The window manager may obtain a size of a display screen, determine whether there is a status bar, perform screen locking, perform screen capturing, and so on. The content provider is configured to store and retrieve data and make the data accessible to an application. The data may include a video, an image, audio, calls made and answered, a browsing history and bookmarks, an address book, and like. The view system includes a visual control, for example, a control for displaying text or a control for displaying a picture. The view system may be configured to build an application. A display interface may include one or more views, for example, a new fingerprint input interface 100 and a prompt information interface 301 shown in FIG. 4. For example, the new fingerprint input interface 100 may display views of a "fingerprint" icon, an "OK" button, and other functional controls.

The phone manager is configured to provide a communication function of the electronic device 600, for example, management of a call status (including answering or declining). The resource manager provides a variety of resources, such as localized character strings, icons, pictures, layout files, video files, and so on, for applications. The notification manager enables an application to display a notification message in a status bar. The notification messages may be used to convey an informative message that may disappear automatically after a short period of time, and no user interaction is required. For example, the notification manager is used for informing completion of downloading, for message alerts, and so on. The notification manager may also provide, on a status bar at the top of the system, a notification in a form of a chart or scroll bar text, for example, a notification of an application running in the background, or provide, on a screen, a notification in a form of a dialog window. For example, text information is displayed in the status bar, a prompt tone is generated, an electronic device vibrates, and an indicator light blinks.

The Android runtime includes a kernel library and a virtual machine. The Android runtime is responsible for scheduling and managing an Android system. The core library includes two parts: one part being functional functions that java needs to call, and the other part being an Android kernel library.

The application layer and the application framework layer run in the virtual machine. The virtual machine executes java files of the application layer and the application framework layer as binary files. The virtual machine is configured to perform functions, such as object life cycle management, stack management, thread management, security and exception management, and garbage collection.

The system library may include a plurality of functional modules, for example, a surface manager (surface manager), a media library (media libraries), a three-dimensional graphics processing library (for example, openGL ES), and a 2D graphics engine (for example, SGL).

The surface manager is configured to manage a display subsystem and provide fusion of 2D and 3D layers for a plurality of applications. The media library supports playback and recording in a plurality of commonly used audio and video formats, and static image files. The media library may support a plurality of audio and video encoding formats, such as MPEG4, H.264, MP3, AAC, AMR, JPG, and PNG. The three-dimensional graphics processing library is configured to implement three-dimensional drawing, image rendering, compositing, and layer processing. The 2D graphics engine is a drawing engine for 2D drawing.

The hardware abstraction layer (hardware abstract layer, HAL) is a set of program libraries built on a Linux driver. It does not belong to a Linux kernel, but belongs to an application layer on a Linux kernel layer. Optionally, the hardware abstraction layer is located at a system running library layer of Android. The HAL layer is run based on a driver of the kernel layer, and the HAL layer in this embodiment mainly includes modules such as a camera HAL, a fingerprint HAL, an audio HAL, a GPS HAL, a Wi-Fi HAL, and the like.

The kernel layer is a layer between hardware and software. The kernel layer includes at least a display driver, a camera driver, an audio driver, a sensor driver, and a fingerprint driver.

With reference to the software architecture of the electronic device given in FIG. 7 and the hardware architecture of the electronic device given in FIG. 6, description is made using an example in which the screen is on through fingerprint unlocking on the mobile phone. In a situation of in-screen fingerprint unlocking for the display screen, the user presses a fingerprint collection region of a touch panel (touch panel, TP) with a finger, the touch panel generates an interrupt event, and transmits the interrupt event to a fingerprint recognition module, to awaken the fingerprint recognition module to perform fingerprint recognition processing. The TP further notifies the fingerprint HAL, and the fingerprint HAL awakens the fingerprint driver, to enable the fingerprint driver to notify the fingerprint sensor to collect a fingerprint image in the fingerprint collection region. After completing fingerprint image collection, the fingerprint sensor transmits the fingerprint image to the fingerprint recognition module to perform operations such as image preprocessing, image determination, image matching, foreign matter marking, fingerprint template library updating, and the like. After performing image matching on the fingerprint image according to fingerprint templates and generating a matching result, the fingerprint recognition module generates an unlocking instruction if the matching result is matching success, the fingerprint recognition module transmits the unlocking instruction to the fingerprint HAL, and the fingerprint HAL notifies, through a fingerprint framework, the TP to perform screen unlocking and screen-on operations on the mobile phone. Optionally, in some fingerprint unlocking applications, after the fingerprint recognition module performs image matching on the fingerprint image according to fingerprint templates and performs the matching successfully, the fingerprint recognition module generates an unlocking instruction if the matching result is matching success, the fingerprint recognition module transmits the unlocking instruction to the fingerprint HAL, and the fingerprint HAL notifies through the fingerprint framework that an unlocking operation is performed in a corresponding fingerprint unlocking application.

Figure 8:
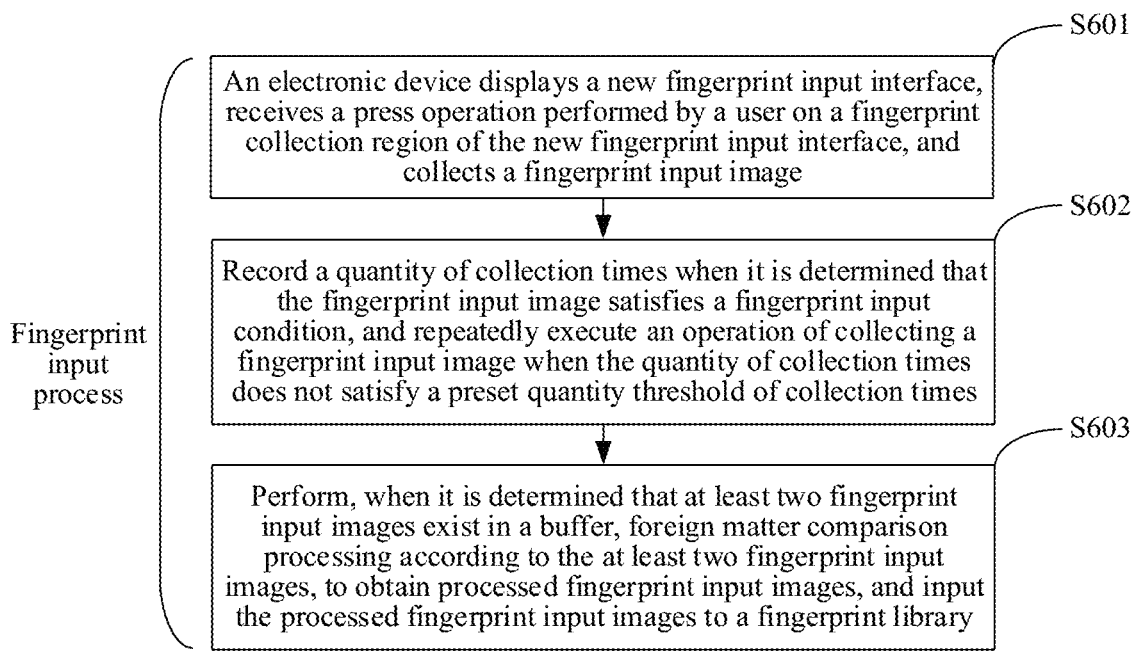
FIG. 8 is a flowchart of a fingerprint input process in a fingerprint recognition method according to an embodiment of this application.

Based on the hardware structure of the electronic device shown in FIG. 6 and the software architecture of the electronic device shown in FIG. 7, using an example in which the electronic device 600 executes an embodiment of the present disclosure, an embodiment of the present disclosure provides a fingerprint recognition method, including two major parts: fingerprint input and fingerprint unlocking. For ease of describing this method, an example in which the electronic device 600 is a mobile phone is used in each of the following embodiments. The method provided in this embodiment is described for a fingerprint input process. For example, as shown in FIG. 8, the method includes:

S601. The electronic device displays a new fingerprint input interface, receives a press operation performed by a user on a fingerprint collection region of the new fingerprint input interface, and collects a fingerprint input image.

With reference to FIG. 3, the new fingerprint input interface 100 may include first prompt information 301, a "fingerprint" icon 302, and an "OK" button 303. A region corresponding to the "fingerprint" icon 302 is the fingerprint collection region. At different stages of the fingerprint input process, the new fingerprint input interface may include the first prompt information 301, the second prompt information 304, and the third prompt information 305. Reference may be made to FIG. 3. When no fingerprint is input, the first prompt information 301 may prompt the user to perform a press operation on the "fingerprint" icon 302, to enable the mobile phone to execute a fingerprint input operation; in a process of inputting a fingerprint, the second prompt information 304 may prompt the user to adjust a position of a finger to continue pressing the "fingerprint" icon 302 to perform fingerprint input; and when fingerprint input is completed, the third prompt information 305 may prompt the user to complete fingerprint input and click the "OK" button 303 to submit the fingerprint.

Optionally, the user may trigger, through a "new fingerprint input" option in a menu interface, the mobile phone to display the new fingerprint input interface 100; or the user may trigger, through voice input "new fingerprint input", the mobile phone to display the new fingerprint input interface 100.

When receiving the press operation performed by the user on the fingerprint collection region of the new fingerprint input interface 100, the mobile phone collects, through the fingerprint sensor, a fingerprint input image formed by the user in the fingerprint collection region. Optionally, because the collected fingerprint input image of the user may have an original image quality problem such as image blurring caused by the fingerprint sensor, the mobile phone may further perform image preprocessing on the fingerprint input image after the mobile phone collects the fingerprint input image, thereby obtaining a fingerprint input image obtained through the image preprocessing. For example, the image preprocessing may include at least one of image enhancement processing, image binarization processing, and the like.

S602. Record a quantity of collection times when it is determined that the fingerprint input image satisfies a fingerprint input condition, and repeatedly execute an operation of collecting a fingerprint input image when the quantity of collection times does not satisfy a preset quantity threshold of collection times.

In this embodiment, after obtaining the fingerprint input image obtained through the image preprocessing, the mobile phone determines whether the fingerprint input image obtained through the image preprocessing satisfies the fingerprint input condition. The fingerprint input condition is used for controlling an image quality dimension and an image fingerprint area dimension of the fingerprint input image. For example, the fingerprint input condition for the image quality dimension includes that an image resolution of the fingerprint input image is greater than a resolution threshold and an image contrast of the fingerprint input image is greater than a contrast threshold, and the fingerprint input condition for the image fingerprint area dimension includes that a valid fingerprint coverage area of the fingerprint input image is greater than an area threshold. In a situation in which a foreign matter exists in the fingerprint collection region, the pattern of the foreign matter may exist in the fingerprint input image. The valid fingerprint coverage area herein may be understood as a press area of a finger fingerprint in the fingerprint input image. It should be noted that the fingerprint input condition may include one of or a combination of two or more of the foregoing conditions, and according to an actual case, the fingerprint input condition may further include another image quality condition that may be used for determining the fingerprint input image. This is not limited in this embodiment.

In the fingerprint input process of this embodiment, for integrity of input fingerprints, it is necessary to collect the finger fingerprint of the user a plurality of times from different angles. Each time collection of a fingerprint input image is completed once, a quantity of collection times may be recorded and updated, and the fingerprint input image is stored into a specified permanent storage space. The storage space herein refers to a permanent secure storage space, for example, a flash memory of the mobile phone. Optionally, space where the mobile phone may store data further includes a temporary storage space, for example, a secure memory of the mobile phone. In a situation of performing fingerprint unlocking or fingerprint support, the mobile phone may load fingerprint templates in the fingerprint template library to the secure memory to perform fingerprint matching. Optionally, the secure memory may be a memory of a register and a buffer of the mobile phone. The operation of collecting a fingerprint input image is repeatedly executed. In addition, the mobile phone may output, from the new fingerprint input interface 100, prompt information used for prompting the user to adjust a finger angle or position to continue performing fingerprint input, with reference to FIG. 3, until the quantity of collection times reaches the preset quantity threshold of collection times, thereby obtaining a plurality of fingerprint input images satisfying the fingerprint input condition from the buffer. The preset quantity threshold of collection times herein may be determined according to an actual case, and may be, for example, 30, 60, or the like. It should be noted that within a period of time for which the user presses once, the mobile phone may control the fingerprint sensor to collect fingerprint input images a plurality of times, and the quantity of collection times of the fingerprint sensor herein is different from the quantity of press times of the user in the fingerprint collection region.

It may be understood that, when it is determined that the collected fingerprint input images do not satisfy the fingerprint input condition, that is, the collected fingerprint input images have at least one of phenomena that a fingerprint input image has an image resolution less than the resolution threshold, that a fingerprint input image has an image contrast less than the contrast threshold, and that a fingerprint input image has a finger fingerprint with a press area less than the area threshold, the mobile phone discards the fingerprint input image, and does not count this collection.

S603. Perform, when it is determined that at least two fingerprint input images exist in a buffer, foreign matter comparison processing according to the at least two fingerprint input images, to obtain processed fingerprint input images, and input the processed fingerprint input images to a fingerprint template library.

When the mobile phone determines that at least two fingerprint input images exist in the buffer, the mobile phone may perform foreign matter comparison according to the at least two fingerprint input images. It is generally believed that, in a fingerprint input process, a foreign matter difficult to clear is in a fixed position in the display screen of the mobile phone. However, because the input finger is manually controlled, a position of a finger fingerprint in the fingerprint collection region has a change in a press process or during position adjustment, and the change may be a slight angle change or a slight direction change. To be specific, in a fingerprint input process, a finger fingerprint reflected in a fingerprint input image collected each time is changed and different, while a foreign matter in the display screen of the mobile phone reflected in a fingerprint input image collected each time is unchanged and fixed. Therefore, when performing foreign matter comparison, the mobile phone may compare a plurality of fingerprint input images through a fingerprint duplicate determination algorithm to determine whether a same pattern in a fixed position exist, to determine whether the pattern of the foreign matter exists in the fingerprint input images. The conventional fingerprint duplicate determination algorithm has a high recognition accuracy rate. Therefore, for the pattern of the foreign matter in the fixed position, the fingerprint duplicate determination algorithm may accurately perform comparison and recognition between the pattern and a finger fingerprint.

In this embodiment, at least two fingerprint input images exist in the buffer, and the mobile phone may perform, according to a time sequence of collecting the at least two fingerprint input images, foreign matter comparison between each fingerprint input image and each previously collected fingerprint input image, to determine whether a same pattern in a fixed position exist. In this embodiment, in a fingerprint input process, collected images in which the pattern of the foreign matter exists are the first type of images.

Figure 9:
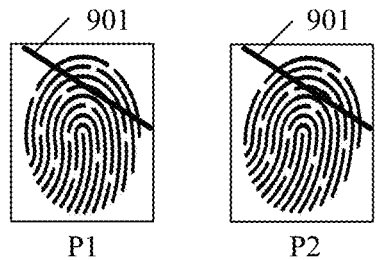
FIG. 9 is a schematic diagram of a same pattern in a fixed position existing in a fingerprint image P1 and a fingerprint image P2 according to an embodiment of this application.

For example, if six fingerprint input images exist in the buffer, according to a time order of collecting the fingerprint input images, a fingerprint input image collected for the first time is defined as P1, a fingerprint input image collected for the second time is defined as P2, a fingerprint input image collected for the third time is defined as P3, a fingerprint input image collected for the fourth time is defined as P4, a fingerprint input image collected for the fifth time is defined as P5, and a fingerprint input image collected for the sixth time is defined as P6. The mobile phone performs comparison and recognition between P2 and P1, to determine whether a same pattern in a fixed position exist in the two; performs comparison and recognition between P3 and each of P2 and P1, to determine whether a same pattern in a fixed position exist in P3 and P2, and in P3 and P1; performs comparison and recognition between P4 and each of P3, P2, and P1, to determine whether a same pattern in a fixed position exist in P4 and P3, in P4 and P2, and in P4 and P1; performs comparison and recognition between P5 and each of P4, P3, P2, and P1, to determine whether a same pattern in a fixed position exist in P5 and P4, in P5 and P3, in P5 and P2, and in P5 and P1; and performs comparison and recognition between P6 and each of P5, P4, P3, P2, and P1, to determine whether a same pattern in a fixed position exist in P6 and P5, in P6 and P4, in P6 and P3, in P6 and P2, and in P6 and P1, and the rest can be deduced by analogy for an image comparison manner of a larger quantity of collection times. For example, FIG. 9 gives a schematic diagram of a same pattern in a fixed position existing in P1 and P2. A mobile phone performs comparison and recognition between P2 and P1, to determine that a same pattern 901 in a fixed position exist in P1 and P2. In this case, the mobile phone determines that the pattern of the foreign matter exists in each of P1 and P2, that is, the foreign matter exists in the current fingerprint collection region.

In this embodiment, after performing foreign matter comparison on a plurality of fingerprint input images, the mobile phone may mark, when determining that the pattern of the foreign matter exists in a fingerprint input image, the pattern of the foreign matter, and the marked pattern of the foreign matter does not participate in matching in the fingerprint unlocking process, that is, in this embodiment, the marking the pattern of the foreign matter is to eliminate the pattern of the foreign matter, without affecting matching of a valid fingerprint.

However, in an actual case, to determine whether a foreign matter is a foreign matter that is easy to clear, and also to make a fingerprint input image more effective, when foreign matter comparison is performed, a foreign matter marking condition may be set. For example, only if it is determined that the pattern of the foreign matter exists in each of a preset quantity of fingerprint input images, the pattern of the foreign matter in the fingerprint input images is marked.

The preset quantity is a cumulative quantity. For example, the preset quantity may be five. If six fingerprint input images exist in the current buffer, the mobile phone determines that a same pattern in a fixed position exist in P2 and P1; a same pattern in a fixed position do not exist in P3 and each of P1 and P2; a same pattern in a fixed position do not exist in P4 and each of P3, P2, and P1 either; a same pattern in a fixed position do not exist in P5 and each of P4, P3, P2, and P1; and a same pattern in a fixed position do not exist in P6 and each of P5, P4, P3, P2, and P1. That is to say, a same pattern in a fixed position exist only in the two images P1 and P2, and the quantity does not satisfy the preset quantity. This case may be understood as that a foreign matter in the fingerprint collection region may be a foreign matter that is easy to clear and the foreign matter is cleared when P3 is collected. In this case, the mobile phone may discard P1 and P2. For example, if the mobile phone determines, through foreign matter comparison, that a same pattern in a fixed position exist in the five images P5, P4, P3, P2, and P1, and the quantity satisfies the preset quantity, it may be understood as that a foreign matter in the fingerprint collection region may be a foreign matter that is uneasy to clear and always exists in a short time. In this case, the mobile phone needs to mark the pattern of the foreign matter.

Figure 10:
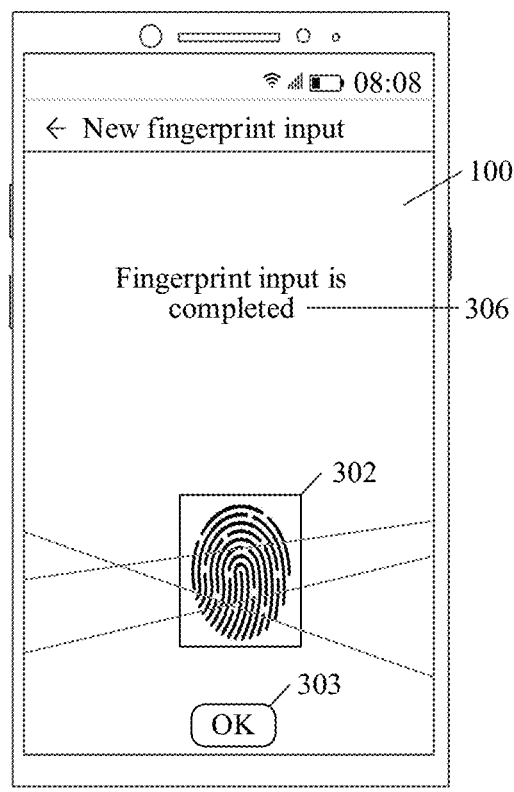
FIG. 10 is a schematic diagram of an interface on which an electronic device outputs prompt information indicating fingerprint input completion according to an embodiment of this application.

Further, the mobile phone inputs the marked fingerprint input image from the buffer to the fingerprint template library, and each fingerprint input image in the fingerprint template library may be referred to as a fingerprint template. Optionally, after all fingerprint input images in this fingerprint input process are input to the fingerprint template library, the mobile phone may further display, in the new fingerprint input interface, fourth prompt information used for prompting the user that "fingerprint input is completed". Reference may be made to FIG. 10. FIG. 10 gives an example in which fourth prompt information 306 is displayed in a new fingerprint input interface 100, where the fourth prompt information 306 may be "fingerprint input is completed". In this case, the user may end a fingerprint input operation by clicking an "OK" button 303 in the new fingerprint input interface 100. Optionally, when receiving an operation of triggering the "OK" button 303 by the user, the mobile phone may jump to a previous-level interaction interface of the new fingerprint input interface 100.

Figure 11:
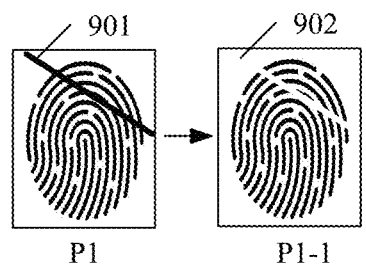
FIG. 11 is a schematic diagram of comparison between an unprocessed pattern and a processed pattern of a foreign matter in fingerprint images according to an embodiment of this application.

In this embodiment, the mobile phone marks the pattern of the foreign matter, and may perform outline marking on an outline of the pattern of the foreign matter through outline recognition. Alternatively, the mobile phone may perform binarization processing on the pattern of the foreign matter, for example, set a grayscale value of the pattern of the foreign matter to a first value, where the first value may be 1 or 0. Alternatively, the mobile phone may extract a coordinate position of the pattern of the foreign matter in the fingerprint input image, and generate marking information corresponding to the pattern of the foreign matter based on the coordinate position. The mobile phone may record the marking information in a secure memory and a secure storage space. For example, the performing binarization processing on the pattern of the foreign matter may be understood as eliminating the pattern of the foreign matter from the fingerprint input image with a grayscale value of 1 or a grayscale value of 0. Reference is made to FIG. 11. FIG. 11 gives processing of setting a grayscale value of a pattern of a foreign matter in a fingerprint image P1 including the pattern 901 of the foreign matter to 1, where an image P1-1 is a processed fingerprint image, and a marked pattern of the foreign matter is 902.

Figure 12:
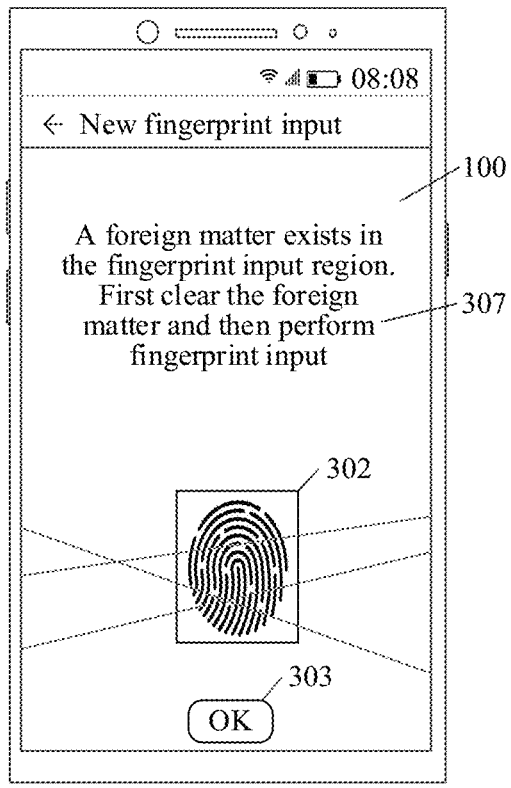
FIG. 12 is a schematic diagram of an interface on which an electronic device outputs, in a fingerprint input process, prompt information indicating that a foreign matter exists in a fingerprint collection region according to an embodiment of this application.

To more effectively collect a fingerprint input image in the fingerprint collection region, and prevent a foreign matter that is easy to clear from affecting collection of the fingerprint input image, optionally, when determining that a same pattern in a fixed position exist in two fingerprint input images, the mobile phone may output, in a current new fingerprint input interface, fifth prompt information used for prompting the user to clear the foreign matter and then perform fingerprint input. Reference may be made to FIG. 12. a new fingerprint input interface 100 includes fifth prompt information 307, where the fifth prompt information 307 may be "A foreign matter exists in the fingerprint collection region. First clear the foreign matter and then perform fingerprint input".

In this embodiment, the mobile phone collects fingerprint input images in the fingerprint input region for a plurality of times, determines, according to the foregoing fingerprint input method, whether the fingerprint input images satisfy the fingerprint input condition, determines a foreign matter for a fingerprint input image satisfies the fingerprint input condition, and stores the fingerprint input image in which the foreign matter exists and the foreign matter is marked into the fingerprint template library, where each fingerprint input image stored into the fingerprint template library is used as a fingerprint template. It should be noted that a fingerprint template set corresponding to one finger in the fingerprint template library may include all fingerprint input images satisfying the fingerprint input condition, the fingerprint input images may further include a fingerprint input image in which the pattern of the foreign matter exists and the foreign matter is marked and a fingerprint input image in which the pattern of the foreign matter does not exist, and a fingerprint template set corresponding to one finger may include at least one fingerprint template.

In this embodiment, the electronic device may perform, based on the fingerprint duplicate determination algorithm, comparison and recognition of the pattern of the foreign matter on at least two fingerprint input images satisfying the fingerprint input condition in the buffer, mark, when determining that a same pattern in a fixed position exist in a preset quantity of fingerprint input images, the pattern of the foreign matter in the fingerprint input images, and input the marked fingerprint input images to the fingerprint template library, so that even if a foreign matter exists in the fingerprint input region, fingerprint input may still be performed, to avoid the problem in the existing technology that a fingerprint cannot be input when a foreign matter exists in the fingerprint collection region.

Figure 13:
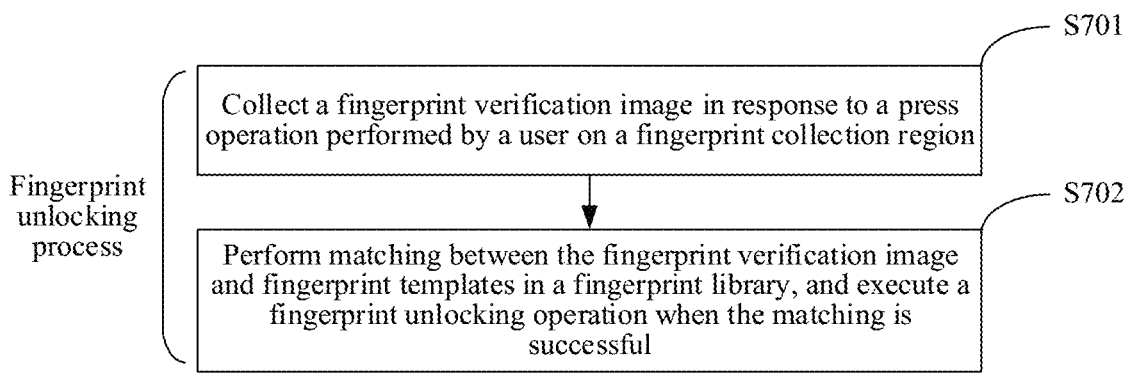
FIG. 13 is a flowchart of a fingerprint unlocking process in a fingerprint recognition method according to an embodiment of this application.

Based on the premise that a fingerprint template exists in the fingerprint template library, the mobile phone executes a fingerprint unlocking operation based on the fingerprint template in the fingerprint template library. Still taking an example in which the electronic device 600 executes an embodiment of the present disclosure and the electronic device 600 is a mobile phone, an embodiment of the present disclosure provides a fingerprint recognition method for a fingerprint unlocking process, as shown in FIG. 13, including:

S701. Collect a fingerprint verification image in response to a press operation performed by a user on a fingerprint collection region.

In some situations, the user may verify the identity of the user by inputting a fingerprint in a fingerprint collection region of a mobile phone. For example, when the mobile phone is in a lock-screen or dormant mode, the user inputs a fingerprint in the fingerprint collection region of the mobile phone, and may unlock the screen of the mobile phone after the mobile phone verifies the identity of the user based on a collected fingerprint verification image. For example, in some payment applications, the user inputs a fingerprint in the fingerprint collection region of the mobile phone, and may successfully perform payment after the mobile phone verifies the identity of the user based on a collected fingerprint verification image. For example, in some encryption applications, the user inputs a fingerprint in the fingerprint collection region of the mobile phone, and may successfully open the encryption applications after the mobile phone verifies the identity of the user based on a collected fingerprint verification image.

In this embodiment, the fingerprint collection region in the fingerprint unlocking situation is consistent with the fingerprint collection region in the fingerprint input situation. For example, the fingerprint collection region may be the region 101 shown in FIG. 1. The user performs a press operation in the fingerprint collection region 101 of the mobile phone, and the mobile phone collects a fingerprint verification image in the fingerprint collection region in response to the press operation.

Optionally, after collecting a fingerprint verification image, the mobile phone may perform image preprocessing on the fingerprint verification image. Similar to the image preprocessing operation executed by the mobile phone in the fingerprint input process, the image preprocessing includes image enhancement processing, image binarization processing, and the like.

S702. Perform matching between the fingerprint verification image and fingerprint templates in a fingerprint template library, and execute a fingerprint unlocking operation when the matching is successful.

In this embodiment, a fingerprint template in the fingerprint template library refers to a fingerprint input image satisfying the fingerprint input method provided in the foregoing embodiment of FIG. 8. The fingerprint template library includes at least one fingerprint template.

After obtaining a fingerprint verification image, the mobile phone performs matching between the fingerprint verification image and each fingerprint template in the fingerprint template library. Usually, fingerprint matching may be to perform feature point matching by extracting a fingerprint feature point of the fingerprint verification image and a fingerprint feature point of a fingerprint template. If a fingerprint feature point of one fingerprint template and the fingerprint feature point of the fingerprint verification image are matched successfully, it is considered that the fingerprint verification image is matched successfully. If a fingerprint feature point of no fingerprint template and the fingerprint feature point of the fingerprint verification image are matched successfully, it is considered that the fingerprint verification image is matched unsuccessfully. It should be noted that fingerprint templates include a fingerprint template in which a pattern of a foreign matter is marked, and that the pattern of the foreign matter is marked in the fingerprint template means that image elimination processing is performed correspondingly on the pattern of the foreign matter. Reference may be made to FIG. 11. A pattern 902 of a foreign matter A in a fingerprint template P1-1 in which the pattern of the foreign matter is marked does not include any valid fingerprint. Therefore, in an actual matching process, the mobile phone cannot extract any fingerprint feature point from the marked pattern of the foreign matter, that is, the marked pattern of the foreign matter does not participate in feature point matching. In other words, in a process of performing fingerprint matching, the mobile phone performs fingerprint feature matching between the fingerprint verification image and a target region of each fingerprint template, to determine a matching result of the fingerprint verification image. The fingerprint templates herein include the first type of images that satisfy the fingerprint input condition and in which a foreign matter is marked, and also include images satisfying the fingerprint input condition other than the first type of images. If the fingerprint templates are the first type of images, a target region is a region in a fingerprint template other than the pattern of the foreign matter. If the fingerprint templates are images other than the first type of images, that is, images in which the pattern of the foreign matter does not exist, a target region of a fingerprint template is an entire image region. In this way, when performing matching between the fingerprint verification image and a fingerprint template, the mobile phone extracts a feature point of a valid fingerprint (an actual finger fingerprint of the user), to obtain a more valid and accurate matching result.

In this embodiment, the mobile phone performs feature point matching between the fingerprint verification image and a fingerprint template in the fingerprint template library, and determines, if at least one fingerprint template and the fingerprint verification image are matched successfully, that the fingerprint verification image is a fingerprint image of the input finger, that is, verifies the identity of the current user successfully. In this case, the mobile phone executes a fingerprint unlocking operation.

Figure 14:
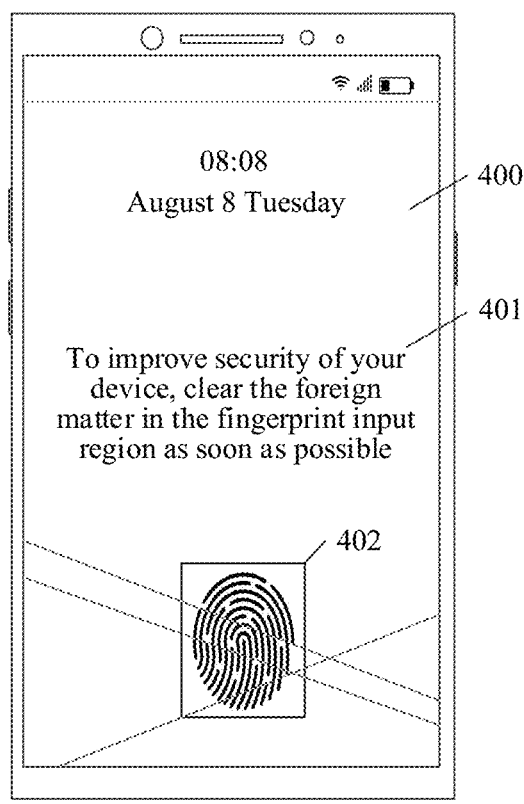
FIG. 14 is a schematic diagram of an interface on which an electronic device outputs, in a fingerprint unlocking success situation, prompt information indicating that a foreign matter exists in a fingerprint collection region according to an embodiment of this application.

When the mobile phone determines that the fingerprint verification image is matched successfully, the mobile phone may further perform foreign matter comparison processing between the fingerprint verification image and each fingerprint template in the fingerprint template library, where the foreign matter comparison processing method is consistent with the foreign matter comparison and recognition processing method involved in the fingerprint input process. When determining that a same pattern in a fixed position exist in the fingerprint verification image and some fingerprint templates, that is, that the pattern of the foreign matter exists in the fingerprint verification image, the mobile phone may display, in a lock-screen interface, an unlocked interface, or a to-be-unlocked application interface, prompt information used for prompting the user to clear the foreign matter as soon as possible. Reference is made to FIG. 14. FIG. 14 gives a schematic diagram of a lock-screen interface 400 of a mobile phone. The lock-screen interface 400 includes prompt information 401 and a "fingerprint" icon 402, where the prompt information 401 may be "To improve security of your device, clear the foreign matter in the fingerprint input region as soon as possible". The "fingerprint" icon 402 may be in a position consistent with that of the "fingerprint" icon 302 in FIG. 3, and the user presses based on a region in which the "fingerprint" icon 402 is located, to trigger an operation of collecting a fingerprint verification image.

Figure 15:
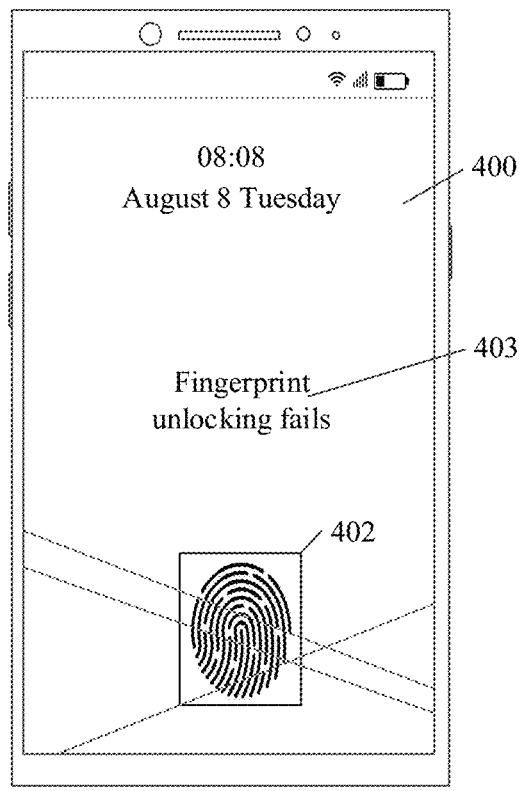
FIG. 15 is a schematic diagram of an interface on which an electronic device outputs prompt information indicating a fingerprint unlocking failure according to an embodiment of this application.
Figure 16:
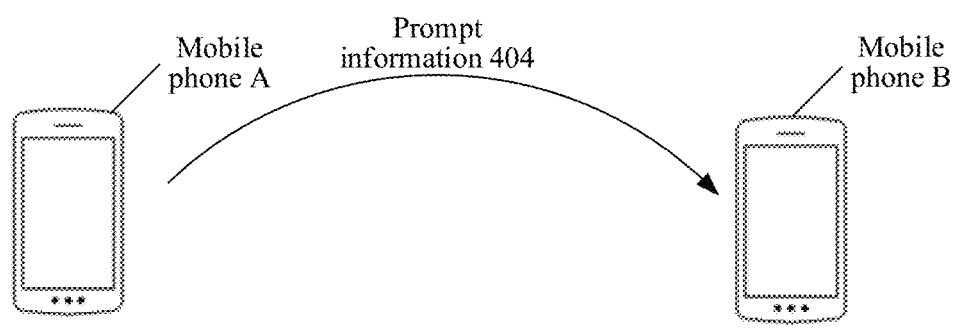
FIG. 16 is a schematic diagram of outputting, by an electronic device, prompt information to a bound electronic device according to an embodiment of this application.

Optionally, if the fingerprint verification image and each fingerprint template in the fingerprint template library are matching unsuccessfully, that is, the identity of the current user is verified unsuccessfully, the mobile phone does not respond to the press operation. A case that the fingerprint verification image and each fingerprint template are matched unsuccessfully may include that the fingerprint verification image is a fingerprint image of a non-input finger. In this case, in addition to not responding to the press operation, the mobile phone may further output alarm information. For example, in a lock-screen case, the screen is awakened, and prompt information used for prompting the user that a risk exists in fingerprint verification is output in the lock-screen interface. Reference may be made to FIG. 15. Prompt information 403 is output in a lock-screen interface 400. For example, the prompt information 403 may be "fingerprint unlocking fails". Further, the mobile phone may further output alarm audio through a speaker to perform a prompt that fingerprint unlocking fails. Optionally, if the mobile phone is bound to another smart device, for example, a mobile phone A is in a binding relationship with a mobile phone B, the mobile phone A may further send, when determining that fingerprint unlocking fails, prompt information 404 to the mobile phone B. Reference is made to FIG. 16. For example, the prompt information 404 may be "The mobile phone A is being unlocked by a non-input fingerprint. Confirm security of the mobile phone A". Optionally, the binding relationship between the mobile phones may be obtained from an application or obtained from a register of the mobile phone system.

In this embodiment, because the pattern of the foreign matter is marked in the fingerprint template in the fingerprint template library of the mobile phone, the mobile phone may discard the marked pattern of the foreign matter without matching in the process of obtaining the fingerprint verification image and performing fingerprint matching, and perform image binarization processing on the pattern of the foreign matter with reference to FIG. 12, thereby performing targeted matching between the fingerprint template and the valid fingerprint in the fingerprint verification image, so that the fingerprint verification image in which the marked pattern of the foreign matter exists may be used for performing fingerprint unlocking. Further, a fingerprint verification image in which the unmarked pattern of the foreign matter exists may also be used for performing matching based on a valid fingerprint in another position, thereby increasing recognition accuracy of the fingerprint verification image in different situations, and also increasing fingerprint unlocking security of the electronic device.

In some embodiments, in a situation of a fingerprint matching failure of the user, in this embodiment, by performing foreign matter comparison on the fingerprint verification image, whether the fingerprint matching failure is caused because of a foreign matter in the fingerprint verification image may be further determined, thereby outputting prompt information to the user, to enhance interaction with the user, and improve the user experience.

Figure 17:
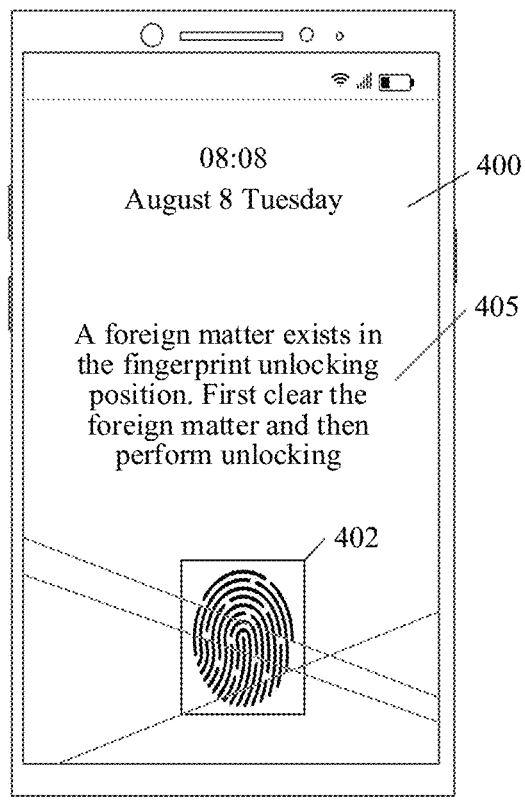
FIG. 17 is a schematic diagram of an interface on which an electronic device outputs, in a fingerprint unlocking failure situation, prompt information indicating that a foreign matter exists in a fingerprint collection region according to an embodiment of this application.

For example, when determining that the fingerprint verification image is matched unsuccessfully, the mobile phone may temporarily store the fingerprint verification image to a specified secure memory; and when a plurality of unsuccessfully matched fingerprint verification images exist in the secure memory, the mobile phone may perform foreign matter comparison processing based on the unsuccessfully matched fingerprint verification images, to determine whether the pattern of the foreign matter exists in the unsuccessfully matched fingerprint verification images, that is, determine whether a reason for unsuccessful matching is that the pattern of the foreign matter that is not input to the fingerprint template library exists in the fingerprint input region. The mobile phone determines that a same pattern in a fixed position exist in some fingerprint verification images of the unsuccessfully matched fingerprint verification images, that is, the pattern of the foreign matter exists in the some fingerprint verification images. In this case, if the mobile phone is in a lock-screen state, the mobile phone may output, in the lock-screen interface by awakening the screen, prompt information used for prompting the user to clear the foreign matter and then perform fingerprint unlocking. Reference may be made to FIG. 17. A lock-screen interface 400 includes prompt information 405. For example, the prompt information 405 may be "A foreign matter exists in the fingerprint unlocking position. First clear the foreign matter and then perform unlocking". If the mobile phone is in a payment application running state, the mobile phone may also output the prompt information 405 in an interface of a current payment application after fingerprint unlocking fails.

In the foregoing embodiment, fingerprint matching is unsuccessful because a foreign matter exists in the fingerprint verification image, and the mobile phone may output prompt information in time, where the prompt information may prompt the user in time to clear the foreign matter, thereby further avoiding impact of the foreign matter that is easy to clear on fingerprint recognition and fingerprint matching.

In an actual situation of fingerprint unlocking, there is further a requirement for updating fingerprint templates in the fingerprint template library. This embodiment considers various cases such as a case that a finger of a person is changed with time, or a case that a fingerprint of a finger is changed because the finger is scratched or healed, or a case that a foreign matter such as a screen crack exists in the fingerprint collection region of the mobile phone in a period of time. To ensure the fingerprint recognition rate, the following embodiment provides a fingerprint template updating method in a fingerprint recognition process, to update fingerprint templates in a fingerprint template library.

Compared with the existing technology, in the existing technology, if it is determined that the pattern of the foreign matter exists in a fingerprint verification image, even when the fingerprint verification image is matched successfully and the fingerprint verification image satisfies a fingerprint template updating condition, the existing technology still discards the fingerprint verification image according to execution logic, to abandon a current opportunity of updating the fingerprint template library. In this way, updating of a valid fingerprint in the fingerprint image is actually affected. For example, the fingerprint template library of the mobile phone of the user does not include a fingerprint template in which the pattern of the foreign matter exists. In a period of time, the user performs fingerprint unlocking when a crack occurs on the screen, and in this case, the fingerprint of the input finger of the user is changed because the wound is healed. According to the existing technology, a result that may occur is that, although the user performs unlocking successfully when a crack exists on the screen, the mobile phone does not update the fingerprint template library according to a collected fingerprint image. Because the fingerprint of the finger of the user is changed in this period of time because the wound is healed in this period of time, but the fingerprint of the finger is not effectively updated in the fingerprint template library, the fingerprint recognition rate of the mobile phone is greatly reduced, and poor user experience is caused.

However, in the fingerprint template updating method in the fingerprint recognition method provided in the embodiments of this application, each time fingerprint unlocking is successful, whether a fingerprint image for successful unlocking satisfies a template updating condition is determined, and a fingerprint image satisfying the template updating condition is temporarily stored into the buffer of the electronic device; and after fingerprint images reach a specific quantity, the pattern of the foreign matter is recognized for the fingerprint images, to determine whether the pattern of the foreign matter exists in the fingerprint images, and the fingerprint images are directly updated to the fingerprint template library if the pattern of the foreign matter does not exist in the fingerprint images. If it is determined that the pattern of the foreign matter exists in a consecutive quantity of fingerprint images, the consecutive quantity of fingerprint images are updated to the fingerprint template library after the pattern of the foreign matter is marked. The determining that a consecutive quantity of fingerprint images exist is to ensure that a current foreign matter is a foreign matter that is not easy to clear, and a fingerprint image collected when the foreign matter exists is necessarily updated to the fingerprint template library. If there are an insufficiently consecutive quantity of fingerprint images in which the pattern of the foreign matter exists, for example, the consecutive quantity is 3, the pattern of the foreign matter exists in two consecutive collected fingerprint images, and the pattern of the foreign matter does not exist in the last fingerprint image, it indicates that the foreign matter is a foreign matter that is easy to clear, and the foreign matter is cleared from the last fingerprint image in which the pattern of the foreign matter does not exist. In this way, the two consecutive fingerprint images in which the pattern of the foreign matter exists are unnecessarily updated to the fingerprint template library.

Figure 18:
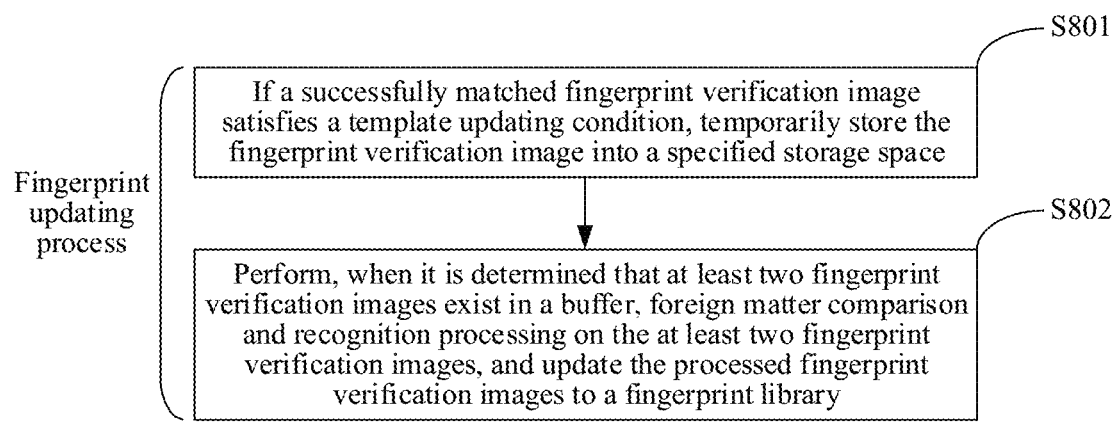
FIG. 18 is a flowchart of fingerprint template updating in a fingerprint recognition method according to an embodiment of this application.

For example, with reference to FIG. 18, the fingerprint template updating method in the fingerprint recognition process provided in this embodiment includes:

S801. If a successfully matched fingerprint verification image satisfies a template updating condition, temporarily store the fingerprint verification image into a specified storage space.

In this embodiment, each fingerprint verification image that is matched successfully and that satisfies the template updating condition is a to-be-updated image. The template updating condition includes that image quality of the to-be-updated image satisfies a quality requirement, for example, a resolution or a contrast of the to-be-updated image is greater than a corresponding parameter threshold; further includes that a valid fingerprint coverage area of the to-be-updated image is greater than an area threshold, where the area threshold herein may be determined according to a valid fingerprint coverage area of an existing fingerprint template; and further includes that a coupling extent between the to-be-updated image and the existing fingerprint template is greater than a coupling threshold, where the coupling extent may be determined according to an overlapping area between the to-be-updated image and the existing fingerprint template.

For example, if the resolution or the contrast of the successfully matched fingerprint verification image satisfies the parameter threshold, the valid fingerprint coverage area in the fingerprint verification image is greater than a valid fingerprint coverage area of 30% fingerprint templates in the fingerprint template library, and an overlapping area reaching 60% exists between the fingerprint verification image and the existing fingerprint template, it is considered that the fingerprint verification image satisfies the template updating condition, and the mobile phone temporarily stores the fingerprint verification image into a specified storage space, for performing foreign matter comparison processing. For example, the specified storage space may be in the buffer or another specified register.

S802. Perform, when it is determined that at least two fingerprint verification images exist in a buffer, foreign matter comparison and recognition processing on the at least two fingerprint verification images, and update the processed fingerprint verification images to a fingerprint template library.

In this embodiment, based on an actual unlocking frequency of the user, the mobile phone obtains, in a period of time, a plurality of fingerprint verification images that are matched successfully and that satisfy an updating policy. Based on the quantity and storage time order of fingerprint verification images in the buffer of the mobile phone, for example, one fingerprint verification image exists in the buffer of the mobile phone. When obtaining a second fingerprint verification image, the mobile phone performs foreign matter comparison processing between the second fingerprint verification image and the fingerprint verification image in the buffer of the mobile phone, and stores the second fingerprint verification image into the buffer of the mobile phone after the foreign matter comparison processing. When obtaining a third fingerprint verification image, the mobile phone performs foreign matter comparison processing between the third fingerprint verification image and each of the first fingerprint verification image and the second fingerprint verification image in the buffer of the mobile phone, and stores the third fingerprint verification image into the buffer of the mobile phone after the foreign matter comparison processing. The rest can be deduced by analogy. Each time one fingerprint verification image is obtained, the mobile phone performs one-to-one foreign matter comparison between the fingerprint verification image and all fingerprint verification images in the buffer, to determine whether a same pattern in a fixed position exist in the fingerprint verification images, that is, determine whether the pattern of the foreign matter exists in the fingerprint verification images. To determine whether a foreign matter is a foreign matter that is easy to clear, and also to ensure validity of the fingerprint verification image, when foreign matter comparison is performed, a foreign matter marking condition may be set. For example, if it is determined that a same pattern in a fixed position exist in a preset consecutive quantity of fingerprint verification images, the pattern of the foreign matter in the fingerprint input images is marked. For example, the preset consecutive quantity may be three or five. In this embodiment, in a fingerprint template updating process, images in which the pattern of the foreign matter exists are the second type of images.

Description is made using an example in which the consecutive quantity is three. If the mobile phone determines, according to the time order in which the fingerprint verification images are stored into the buffer, that a same pattern in a fixed position exist in all the three consecutive fingerprint verification images, the same pattern in the fixed position in the three fingerprint verification images is marked, reference may be made to the foreign matter comparison processing method provided in the embodiment of FIG. 8, and the three fingerprint verification images in which the pattern of the foreign matter is marked are updated to the fingerprint template library. If the mobile phone determines that a same pattern in a fixed position exist in two consecutive fingerprint verification images, and according to the time order, a same pattern in a fixed position do not exist between the third fingerprint verification image and the first two fingerprint verification images, it may be considered that a foreign matter in the current fingerprint collection region is a foreign matter that is easy to clear, and the foreign matter is cleared when the third fingerprint verification image is collected. In this case, the two fingerprint verification images in which the pattern of the foreign matter exists have no updating value, and are discarded. If the mobile phone determines that a same pattern in a fixed position do not exist in any two fingerprint verification images, the fingerprint verification images are directly updated to the fingerprint template library.

In this embodiment, particularly for a situation in which the pattern of the foreign matter exists in a fingerprint verification image, only when it is determined that in the buffer, the pattern of the foreign matter exists in each of a preset consecutive quantity of fingerprint verification images that are matched successfully and that satisfy the template updating condition, the electronic device marks the fingerprint verification images in which the pattern of the foreign matter exists, and updates the fingerprint verification images in which the pattern of the foreign matter is marked to the data library. The foreign matter in this case is a foreign matter that is not easy to clear. To prevent the foreign matter from affecting fingerprint matching, it is necessary for the mobile phone to update the fingerprint verification image with the pattern of the foreign matter to the fingerprint template library, so that a subsequently collected fingerprint verification image with the pattern of the foreign matter may be matched with a fingerprint template based on a valid fingerprint in another position, to avoid the problem in the existing technology that a non-input fingerprint may unlock or the fingerprint recognition rate is reduced because a fingerprint image with the pattern of the foreign matter is discarded and updating of a valid fingerprint in another position is ignored, leading to a case that fingerprint templates in the fingerprint template library are not updated in time or coverage of fingerprint templates in the fingerprint template library is not comprehensive.

Figure 19:
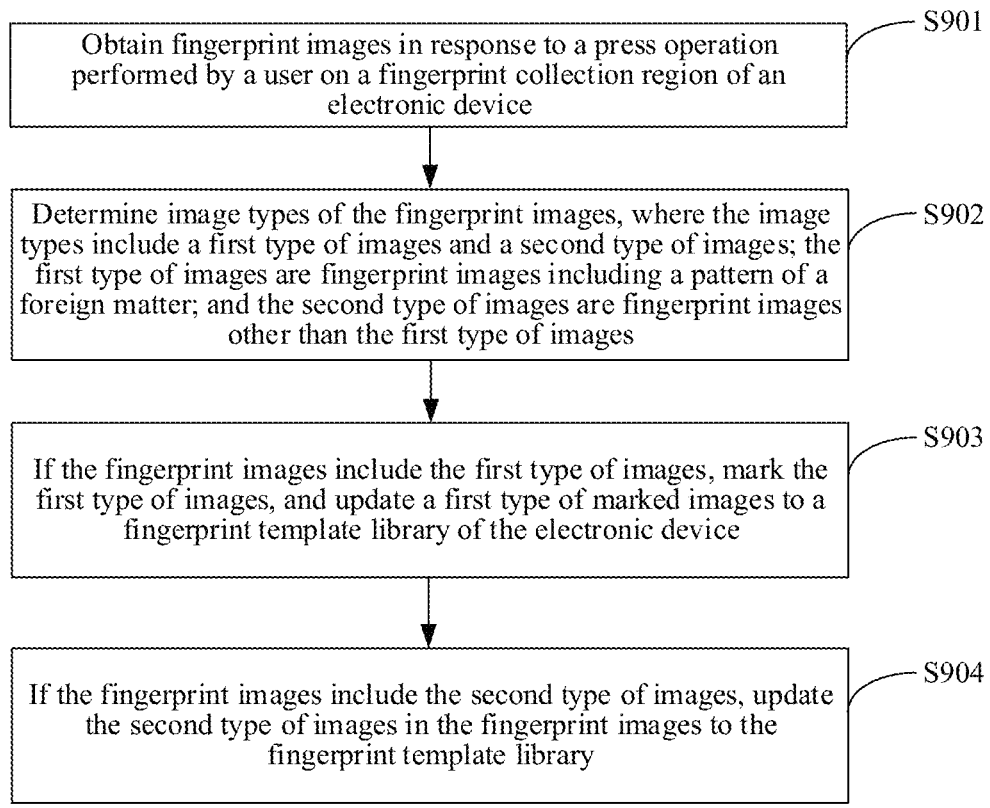
FIG. 19 is a flowchart of a fingerprint recognition method according to an embodiment of this application.

In a feasible manner, an embodiment provides a fingerprint recognition method. As shown in FIG. 19, the method includes:

S901. Obtain fingerprint images in response to a press operation performed by a user on a fingerprint collection region of an electronic device.

In this embodiment, The press operation performed by the user on the fingerprint collection region of the electronic device may be the press operation that is received by the electronic device and that is performed by the user on the fingerprint collection region of the new fingerprint input interface in the fingerprint input situation in S601 of the foregoing embodiments; or the press operation that is received by the electronic device and that is performed by the user on the fingerprint collection region in the fingerprint verification situation in S701 of the foregoing embodiments.

In the fingerprint input situation, the electronic device obtains a fingerprint image in response to a press operation performed by the user on the fingerprint collection region of the electronic device. The fingerprint image herein is a fingerprint input image. Reference may be made to the method provided in S601 and S602 of the foregoing embodiments, and details are not described herein. In the fingerprint verification situation, the electronic device obtains a fingerprint image in response to a press operation performed by the user on the fingerprint collection region of the electronic device. The fingerprint image herein is a fingerprint verification image. Reference may be made to the method provided in S701 of the foregoing embodiments, and details are not described herein.

S902. Determine image types of the fingerprint images. The image types include a first type of images and a second type of images; the first type of images are fingerprint images including a pattern of a foreign matter; and the second type of images are fingerprint images other than the first type of images.

In this embodiment, in each fingerprint input situation, the electronic device may obtain a plurality of fingerprint images, and the electronic device performs foreign matter comparison on the plurality of fingerprint images, to determine the image types of the fingerprint images. For a method for determining, by the electronic device, an image type of a fingerprint image, reference may be made to S603 in the foregoing embodiments. When it is determined that the pattern of the foreign matter exists in each of a preset quantity of fingerprint images, it is determined, that the preset quantity of fingerprint images are the first type of images. The electronic device determines that the fingerprint images in which the pattern of the foreign matter does not exist are the second type of images. In each fingerprint verification situation, the electronic device obtains one fingerprint image. After determining that one fingerprint image for the current time is matched successfully, the electronic device may perform foreign matter comparison between the one fingerprint image obtained for the current time and fingerprint images obtained in a situation of a plurality of preceding times of fingerprint verification, to determine an image type of the one fingerprint image obtained for the current time. Reference may be made to the embodiment provided in FIG. 8. When it is determined that the pattern of the foreign matter exists in each of a preset quantity of consecutive fingerprint images including one fingerprint image for the current time, it is determined that the preset quantity of fingerprint images are the first type of images, that is, it is determined that the one fingerprint image for the current time is the first type of images. The electronic device determines that the fingerprint images in which the pattern of the foreign matter does not exist are the second type of images.

S903. If the fingerprint images include the first type of images, mark the first type of images, and update a first type of marked images to a fingerprint template library of the electronic device.

In this embodiment, the electronic device determines, by determining types of fingerprint images, the first type of images including the pattern of the foreign matter, marks the pattern of the foreign matter in the first type of images, and stores the first type of images with the marked pattern of the foreign matter as fingerprint templates into the fingerprint template library. The marking means that the pattern of the foreign matter is eliminated. In a process of performing fingerprint matching based on fingerprint templates in the fingerprint template library, the pattern of the foreign matter in the first type of images do not affect fingerprint matching. In a fingerprint input situation, for a method for marking, by the electronic device, the first type of images, reference may be made to S603 in the foregoing embodiments, and details are not described herein. In a fingerprint verification situation, for a method for marking, by the electronic device, the first type of images, reference may be made to S802 in the foregoing embodiments, and details are not described herein.

S904. If the fingerprint images include the second type of images, update the second type of images in the fingerprint images to the fingerprint template library.

In this embodiment, the second type of images are images excluding the pattern of the foreign matter. In a fingerprint input situation, each of the second type of images satisfying the fingerprint input condition may be updated to the fingerprint template library. For the fingerprint input condition, reference may be made to the method provided in S602 of the foregoing embodiments. In a fingerprint verification situation, each of the second type of images that succeed in fingerprint matching and that satisfy the template updating condition may be updated to the fingerprint template library. For the template updating condition, reference may be made to the method provided in S801 of the foregoing embodiments. Details are not described herein.

In this embodiment, regardless of being in a fingerprint input situation or a fingerprint verification situation, the electronic device may determine image types of obtained fingerprint images, that is, recognize whether the obtained fingerprint images include the first type of images. When it is determined that the obtained fingerprint images include the first type of images, the first type of images are marked. In a fingerprint input situation, the marked fingerprint images are input to the fingerprint template library. In a fingerprint verification situation, the marked fingerprint images are updated to the fingerprint template library. In each of the foregoing situations, an operation of updating the fingerprint images with the marked pattern of the foreign matter is implemented. The marked pattern of the foreign matter does not participate in fingerprint matching, so that the marked pattern of the foreign matter in the first type of images do not affect matching of other valid fingerprints, thereby increasing the fingerprint recognition rate.

Some embodiments of this application provide an electronic device. The electronic device may include a memory, a display screen, a fingerprint sensor, and one or more processors. The display screen, the fingerprint sensor, and the memory are coupled to the processor. The memory is configured to store computer program code. The computer program code includes computer instructions. When the processors execute the computer instructions, the electronic device may perform various functions or steps performed by the electronic device in the method embodiments. For a structure of the electronic device, reference may be made to the structure of the electronic device 600 shown in FIG. 6.

Figure 20:
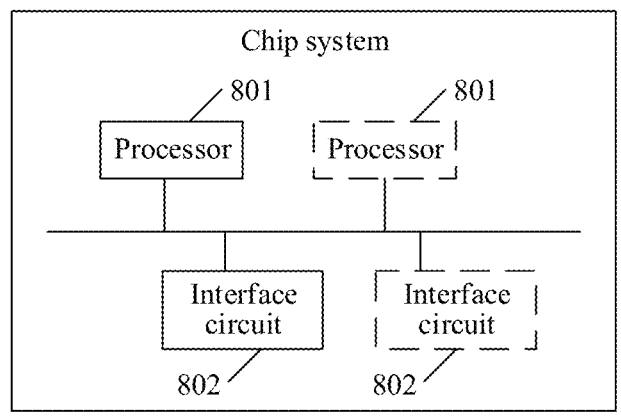
FIG. 20 is a schematic diagram of a structure of a chip system according to an embodiment of this application.

An embodiment of this application further provides a chip system (for example, system on a chip (system on a chip, SoC)). As shown in FIG. 20, the chip system includes at least one processor 801 and at least one interface circuit 802. The processor 801 and the interface circuit 802 may be connected to each other by using a line. For example, the interface circuit 802 may be configured to receive a signal from another apparatus (for example, the memory of the electronic device). For another example, the interface circuit 802 may be configured to send a signal to another apparatus (for example, the processor 801 or a touchscreen of an electronic device or a camera of an electronic device). For example, the interface circuit 802 may read an instruction stored in the memory, and send the instruction to the processor 801. When executed by the processor 801, the instruction causes the electronic device to perform each step in the foregoing embodiment. Certainly, the chip system may further include other discrete devices, which is not specifically limited in this embodiment of this application.

An embodiment of this application further provides a computer-readable storage medium. The computer-readable storage medium includes computer instructions. When the computer instructions run on the foregoing electronic device, the electronic device is enabled to perform the functions or steps performed by the electronic device 600 in the foregoing method embodiment.

An embodiment of this application further provides a computer program product. When the computer program product is run on a computer, the computer is caused to perform the functions or steps performed by the electronic device 600 in the foregoing method embodiments. For example, the computer may be the foregoing electronic device 600.

Based on the descriptions of the foregoing implementations, a person skilled in the art may clearly understand that, for a purpose of convenient and brief description, division into the foregoing functional modules is merely used as an example for illustration. In actual application, the foregoing functions may be allocated to different functional modules and implemented according to a requirement. In other words, an inner structure of the apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of solutions of embodiments.

In addition, functional units in embodiments of this application may be integrated into one processing unit, each of the units may exist alone physically, or two or more units are integrated into one unit. The integrated unit may be implemented in a form of hardware or a software function unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a mobile hard disk, a read only memory (read only memory, ROM), a random access memory (random access memory, RAM), a magnetic disk, or an optical disc.

The foregoing content is merely specific embodiments of this application, but is not intended to limit the protection scope of this application. Any variation or replacement within the technical scope disclosed in this application shall fall within the protection scope of this application. Therefore, the protection scope of this application shall be subject to the protection scope of claims.

The invention claimed is:

1. A fingerprint recognition method, comprising:
obtaining one or more fingerprint images in response to a press operation performed by a user on a fingerprint collection region of an electronic device;
determining image types of the one or more fingerprint images, wherein the image types comprise a first type of images, and the first type of images are fingerprint images comprising a pattern of a foreign matter, and wherein in a fingerprint input situation, the one or more fingerprint images comprise a plurality of fingerprint images, and determining image types of the one or more fingerprint images comprises:
  performing foreign matter comparison between a current fingerprint image and each preceding fingerprint image,
  determining, if it is determined that the pattern of the foreign matter exists in a first quantity of fingerprint images, that the first quantity of fingerprint images are the first type of images, and
  determining fingerprint images in the plurality of fingerprint images other than the first type of images as a second type of images, wherein the second type of images are fingerprint images other than the first type of images, the pattern of the foreign matter is a same texture in a same fixed position in the plurality of fingerprint images; and
determining that the one or more fingerprint images comprise the first type of images, marking the first type of images, and updating a first type of marked images to a fingerprint template library of the electronic device.

2. The method according to claim 1, wherein after the obtaining one or more fingerprint images, the method further comprises:
determining that each of the one or more fingerprint images satisfies a fingerprint input condition, wherein that the fingerprint input condition is satisfied comprises: image quality of the fingerprint image satisfies a quality requirement, and a valid fingerprint coverage area in the fingerprint image is greater than an area threshold, wherein that the image quality satisfies the quality requirement comprises: a resolution of the fingerprint image is greater than a resolution threshold, and/or a contrast of the fingerprint image is greater than a contrast threshold.

3. The method according to claim 1, wherein in a fingerprint verification situation, the one or more fingerprint images are one fingerprint image, the fingerprint template library comprises at least one fingerprint template; and before the determining image types of the one or more fingerprint images, the method further comprises:
performing matching between the one fingerprint image and a fingerprint template in the fingerprint template library; and
determining that the one fingerprint image and any fingerprint template in the fingerprint template library are matched successfully.

4. The method according to claim 3, wherein the method further comprises:
storing each successfully matched fingerprint image into a temporary storage space of the electronic device.

5. The method according to claim 4, wherein the determining image types of the one or more fingerprint images comprises:
performing foreign matter comparison between the one fingerprint image and each fingerprint image matched successfully in a situation of preceding N times of fingerprint verification; and
determining, if it is determined that the pattern of the foreign matter exists in a second quantity of consecutive fingerprint images comprising the one fingerprint image, that the second quantity of consecutive fingerprint images are the first type of images, wherein the pattern of the foreign matter is a same texture in a same fixed position in the plurality of fingerprint images; and the second quantity is greater than or equal to a second preset quantity.

6. The method according to claim 4, wherein after the storing each successfully matched fingerprint image into a temporary storage space of the electronic device, the method further comprises:

determining that the one fingerprint image satisfies a fingerprint updating condition, wherein that the fingerprint updating condition is satisfied comprises: image quality of the fingerprint image satisfies a quality requirement, a valid fingerprint coverage area in the fingerprint image is greater than an area threshold, and a coupling extent between the fingerprint image and a fingerprint template in the fingerprint template library is greater than a coupling threshold, wherein that the image quality satisfies the quality requirement comprises: a resolution of the fingerprint image is greater than a resolution threshold, and/or a contrast of the fingerprint image is greater than a contrast threshold.

7. The method according to claim 3, wherein if the pattern of the foreign matter is marked in a fingerprint template, the performing matching between the one fingerprint image and a fingerprint template in the fingerprint template library comprises:

performing matching between the one fingerprint image and an image region in the fingerprint template excluding the marked pattern of the foreign matter.

8. The method according to claim 3, wherein if the pattern of the foreign matter is not marked in a fingerprint template, the performing matching between the one fingerprint image and a fingerprint template in the fingerprint template library comprises:

performing matching between the one fingerprint image and a whole image region in the fingerprint template.

9. The method according to claim 3, wherein the fingerprint template library is stored into a permanent storage space of the electronic device.

10. The method according to claim 3, wherein the marking comprises either of elimination processing and binarization processing.

11. The method according to claim 3, wherein the obtaining one or more fingerprint images comprises:

collecting an initial fingerprint image in the fingerprint collection region; and performing image preprocessing on the initial fingerprint image, to obtain the one or more fingerprint images, wherein the preprocessing comprises at least one of image enhancement processing, image binarization processing, and image noise reduction processing.

12. The method according to claim 3, wherein the method further comprises:

outputting prompt information if it is determined that the first type of images exist in the one or more fingerprint images, wherein the prompt information is used for prompting the user to clear the foreign matter in the fingerprint collection region.

13. The method according to claim 1, wherein the fingerprint template library is stored into a permanent storage space of the electronic device.

14. The method according to claim 1, wherein the marking comprises either of elimination processing and binarization processing.

15. The method according to claim 1, wherein the obtaining one or more fingerprint images comprises:

collecting an initial fingerprint image in the fingerprint collection region; and performing image preprocessing on the initial fingerprint image, to obtain the one or more fingerprint images, wherein the preprocessing comprises at least one of image enhancement processing, image binarization processing, and image noise reduction processing.

16. The method according to claim 1, wherein the method further comprises:

outputting prompt information if it is determined that the first type of images exist in the one or more fingerprint images, wherein the prompt information is used for prompting the user to clear the foreign matter in the fingerprint collection region.

17. The method according to claim 1, wherein the image types comprise a second type of images, and the method further comprises:

determining that the one or more fingerprint images comprise the second type of images, and updating the second type of images to the fingerprint template library.

18. An electronic device, wherein the electronic device comprises a memory, a display screen, and one or more processors; the memory and the display screen are coupled to the processor; and the memory stores computer program code, the computer program code comprises computer instructions, and when the computer instructions are executed by the processor, the electronic device is enabled to perform a method, the method comprising:

obtaining one or more fingerprint images in response to a press operation performed by a user on a fingerprint collection region of the electronic device;

determining image types of the one or more fingerprint images, wherein the image types comprise a first type of images, and the first type of images are fingerprint images comprising a pattern of a foreign matter, and wherein in a fingerprint input situation, the one or more fingerprint images comprise a plurality of fingerprint images, and determining image types of the one or more fingerprint images comprises:

performing foreign matter comparison between a current fingerprint image and each preceding fingerprint image, determining, if it is determined that the pattern of the foreign matter exists in a first quantity of fingerprint images, that the first quantity of fingerprint images are the first type of images, and determining fingerprint images in the plurality of fingerprint images other than the first type of images as a second type of images, wherein the second type of images are fingerprint images other than the first type of images, the pattern of the foreign matter is a same texture in a same fixed position in the plurality of fingerprint images; and determining that the one or more fingerprint images comprise the first type of images, marking the first type of images, and updating a first type of marked images to a fingerprint template library of the electronic device.

19. A computer-readable storage medium, comprising computer instructions, wherein when the computer instructions are run on an electronic device, the electronic device is enabled to perform a method, the method comprising:

obtaining one or more fingerprint images in response to a press operation performed by a user on a fingerprint collection region of the electronic device;

determining image types of the one or more fingerprint images, wherein the image types comprise a first type of images, and the first type of images are fingerprint images comprising a pattern of a foreign matter, and wherein in a fingerprint input situation, the one or more fingerprint images comprise a plurality of fingerprint images, and determining image types of the one or more fingerprint images comprises:

performing foreign matter comparison between a current fingerprint image and each preceding fingerprint image, determining, if it is determined that the pattern of the foreign matter exists in a first quantity of fingerprint images, that the first quantity of fingerprint images are the first type of images, and determining fingerprint images in the plurality of fingerprint images other than the first type of images as a second type of images, wherein the second type of images are fingerprint images other than the first type of images, the pattern of the foreign matter is a same texture in a same fixed position in the plurality of fingerprint images; and determining that the one or more fingerprint images comprise the first type of images, marking the first type of images, and updating a first type of marked images to a fingerprint template library of the electronic device.

20. The method according to claim 1, wherein the first quantity is greater than or equal to a first preset quantity.

\* \* \* \* \*